United States Patent
Sato et al.

(10) Patent No.: US 12,548,799 B2
(45) Date of Patent: Feb. 10, 2026

(54) LAMINATE FOR SECONDARY BATTERY AND SECONDARY BATTERY, AND METHODS OF PRODUCING SAME

(71) Applicant: ZEON CORPORATION, Tokyo (JP)

(72) Inventors: Masanobu Sato, Tokyo (JP); Hiroshi Koga, Tokyo (JP); Masuhiro Onishi, Tokyo (JP); Koji Annaka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 830 days.

(21) Appl. No.: 17/272,652

(22) PCT Filed: Sep. 12, 2019

(86) PCT No.: PCT/JP2019/035887
§ 371 (c)(1),
(2) Date: Mar. 2, 2021

(87) PCT Pub. No.: WO2020/054801
PCT Pub. Date: Mar. 19, 2020

(65) Prior Publication Data
US 2021/0344048 A1    Nov. 4, 2021

(30) Foreign Application Priority Data
Sep. 12, 2018    (JP) .................................. 2018-170812

(51) Int. Cl.
*H01M 10/0585* (2010.01)
*H01M 10/0525* (2010.01)
*H01M 50/209* (2021.01)

(52) U.S. Cl.
CPC ... *H01M 10/0585* (2013.01); *H01M 10/0525* (2013.01); *H01M 50/209* (2021.01)

(58) Field of Classification Search
CPC . H01M 10/0525–0585; H01M 50/209; H01M 50/403; H01M 50/46; H01M 10/0413–0436; Y02E 60/10; Y02P 70/50
See application file for complete search history.

(56) References Cited

U.S. PATENT DOCUMENTS

| | | |
|---|---|---|
| 2019/0165424 A1 | 5/2019 | Aritomo et al. |
| 2019/0221808 A1 | 7/2019 | Honda et al. |
| 2019/0334205 A1* | 10/2019 | Waseda ............. H01M 10/0562 |

FOREIGN PATENT DOCUMENTS

| | | |
|---|---|---|
| JP | 2012204303 A | 10/2012 |
| JP | 2013145763 A | 7/2013 |

(Continued)

OTHER PUBLICATIONS

Lee et al., KR20170022042 English translation, Korean Intellectual Property Office, (Year: 2017).*

(Continued)

*Primary Examiner* — Jonathan G Leong
*Assistant Examiner* — Kan Luo
(74) *Attorney, Agent, or Firm* — KENJA IP LAW PC

(57) ABSTRACT

A method of producing a laminate includes: a step (A) of producing an affixed body including a negative electrode material and separator webs affixed to both surfaces of the negative electrode material or an affixed body including a negative electrode material, a first separator web, a positive electrode, and a second separator web affixed in stated order; and a step (B) of cutting the affixed body. The step (A) includes a step (a1) of applying an adhesive material at affixing surfaces of the negative electrode material and the separator webs. The adhesive material is applied in the step (a1) such that a first coated section including a region where the adhesive material is applied with a coating weight M1 and a second coated section including a region where the (Continued)

adhesive material is applied with a coating weight $M2 \geq (M1+0.02$ g/m$^2$) are located alternately in a longitudinal direction.

13 Claims, 8 Drawing Sheets

(56) References Cited

FOREIGN PATENT DOCUMENTS

| | | | | |
|---|---|---|---|---|
| JP | 2017027945 A | | 2/2017 | |
| JP | 2017073328 A | | 4/2017 | |
| JP | 2017103092 A | | 6/2017 | |
| KR | 20170022042 | * | 3/2017 | .......... H01M 2/1686 |
| WO | 2018021263 A1 | | 2/2018 | |
| WO | 2018060773 A1 | | 4/2018 | |

OTHER PUBLICATIONS

Nov. 26, 2019, International Search Report issued in the International Patent Application No. PCT/JP2019/035887.
Mar. 9, 2021, International Preliminary Report on Patentability issued in the International Patent Application No. PCT/JP2019/035887.
May 10, 2022, the Extended European Search Report issued by the European Patent Office in the corresponding European Patent Application No. 19860202.1.

\* cited by examiner

LAMINATE FOR SECONDARY BATTERY AND SECONDARY BATTERY, AND METHODS OF PRODUCING SAME

TECHNICAL FIELD

The present disclosure relates to a laminate for a secondary battery, a method of producing a laminate for a secondary battery, a secondary battery, and a method of producing a secondary battery.

BACKGROUND

Secondary batteries such as lithium ion secondary batteries have characteristics such as compact size, light weight, high energy-density, and the ability to be repeatedly charged and discharged, and are used in a wide range of applications. A secondary battery generally includes battery members such as a positive electrode, a negative electrode, and a separator that isolates the positive electrode and the negative electrode from each other and prevents short circuiting between the positive and negative electrodes.

Known secondary battery structures include a stacked structure in which a positive electrode, a separator, and a negative electrode are stacked alternately and a wound structure in which an elongated positive electrode, separator, and negative electrode are overlapped and then wound up concentrically. In particular, stacked secondary batteries have been attracting interest in recent years from a viewpoint of having excellent energy density, safety, quality, and durability.

A technique of affixing an elongated electrode web and an elongated separator web and then performing cutting thereof to a desired length to obtain a laminate for a secondary battery, for example, is conventionally adopted in production of secondary batteries. Note that adhesion of battery members in production of a laminate for a secondary battery, such as adhesion of an electrode web and a separator web, is performed by producing a battery member that includes an adhesive material at a surface thereof and then affixing this battery member and another battery member, for example. Moreover, a battery member having an adhesive material at a surface thereof can be produced, for example, by applying, onto the battery member surface, a slurry for a secondary battery containing a polymer (binder) displaying adhesiveness and so forth that are dispersed and/or dissolved in a solvent, and then drying the slurry for a secondary battery (for example, refer to Patent Literature (PTL) 1).

CITATION LIST

Patent Literature

PTL 1: JP2017-27945A

SUMMARY

Technical Problem

In the case of a laminate for a secondary battery that is to be used in a stacked secondary battery, a laminate in which a separator and a negative electrode have a larger size than a positive electrode is desirable from a viewpoint of safety. For this reason, the following methods (1) to (4) may, for example, be considered as methods of producing a laminate for a secondary battery that is to be used in a stacked secondary battery (refer to FIGS. 4A to 4D).

(1) A method in which elongated separator webs (first separator web 10A and second separator web 30A) are affixed to both surfaces of an elongated negative electrode web 20A, a positive electrode 40 that has been cut in advance is subsequently affixed to a surface of the first separator web 10A at the opposite side thereof to the negative electrode web 20A, and finally an affixed body of the positive electrode 40, the first separator web 10A, the negative electrode web 20A, and the second separator web 30A is cut by a cutting machine 70 (refer to FIG. 4A)

(2) A method in which elongated separator webs (first separator web 10A and second separator web 30A) are affixed to both surfaces of an elongated negative electrode web 20A, the resultant affixed body is subsequently cut by a cutting machine 70, and finally a positive electrode 40 that has been cut in advance is affixed to a surface of a first separator 10 at the opposite side thereof to a negative electrode 20 (refer to FIG. 4B)

(3) A method in which an elongated negative electrode web 20A, an elongated first separator web 10A, a positive electrode 40 that has been cut in advance, and an elongated second separator web 30A are stacked and affixed in stated order, and then the second separator web 30A, the first separator web 10A, and the negative electrode web 20A of the resultant affixed body are cut by a cutting machine 70 (refer to FIG. 4C)

(4) A method in which an elongated first separator web 10A and an elongated second separator web 30A are affixed in a state with a negative electrode 20 that has been cut in advance interposed therebetween, a positive electrode 40 that has been cut in advance is subsequently affixed to a surface of the first separator web 10A at the opposite side thereof to the negative electrode 20, and finally the first separator web 10A and the second separator web 30A of the resultant affixed body are cut by a cutting machine 70 (refer to FIG. 4D)

However, in the conventional methods of producing a laminate for a secondary battery described above, there are cases in which a separator peels from a negative electrode and curls up at a cut section during cutting performed after separator webs, etc., have been affixed.

Accordingly, an object of the present disclosure is to provide a laminate for a secondary battery in which separator curling up is inhibited and a secondary battery in which this laminate for a secondary battery is used.

Solution to Problem

The inventors conducted diligent studies with the aim of achieving the object set forth above. The inventors discovered that by providing a specific distribution of the amount of an adhesive material at an affixing surface of a negative electrode and a separator, it is possible to inhibit curling up of the separator during cutting, and, in this manner, completed the present disclosure.

Specifically, the present disclosure aims to advantageously solve the problem set forth above, and a presently disclosed laminate for a secondary battery comprises: a negative electrode; a first separator affixed to one surface of the negative electrode; a positive electrode affixed to a surface of the first separator at an opposite side of the first separator to the negative electrode; and a second separator affixed to another surface of the negative electrode or to a surface of the positive electrode at an opposite side of the positive electrode to the first separator, wherein the positive electrode has a smaller size in plan view than the negative electrode, the first separator, and the second separator, the negative electrode includes a first edge and a second edge that are in opposition in an orthogonal direction to a stacking direction in plan view, the positive electrode is located between the first edge and the second edge when viewed in the stacking direction, an affixing surface of the negative electrode and a separator affixed to the negative electrode includes a projected section where the positive electrode is projected and a non-projected section where the positive electrode is not projected when the positive electrode is projected in the stacking direction, the non-projected section includes a first non-projected part that is located closer than the projected section to the first edge and a second non-projected part that is located closer than the projected section to the second edge, the projected section, the first non-projected part, and the second non-projected part each include a coated region where an adhesive material has been applied, and coating weight in the coated regions of the first non-projected part and the second non-projected part is at least 0.02 g/m$^2$ more than coating weight in the coated region of the projected section. A laminate for a secondary battery in which the coating weight in the coated regions of the first non-projected part and the second non-projected part is at least 0.02 g/m$^2$ more than the coating weight in the coated region of the projected section in this manner can inhibit peeling of a separator from a negative electrode and curling up of the separator during production.

In the presently disclosed laminate for a secondary battery, it is preferable that the adhesive material has not been applied at an edge part that extends along the first edge and an edge part that extends along the second edge in the non-projected section. A laminate for a secondary battery in which an adhesive material has not been applied at an edge part that extends along the first edge and an edge part that extends along the second edge can be efficiently produced while also inhibiting attachment of the adhesive material to a cutting tool used in production.

In the presently disclosed laminate for a secondary battery, it is preferable that the adhesive material has not been applied within a range up to a distance of 1,000 μm from the first edge and a range up to a distance of 1,000 μm from the second edge in the non-projected section. A laminate for a secondary battery in which an adhesive material has not been applied within a range up to a distance of 1,000 μm from the first edge and a range up to a distance of 1,000 μm from the second edge can be efficiently produced while also inhibiting attachment of adhesive material to a cutting tool used in production.

In the presently disclosed laminate for a secondary battery, it is preferable that the coating weight in the coated region of the projected section is not less than 0.01 g/m$^2$ and not more than 3.00 g/m$^2$. When the coating weight in the coated region of the projected section is not less than 0.01 g/m$^2$ and not more than 3.00 g/m$^2$, sufficient adhesive strength can be ensured while also inhibiting increased internal resistance of a secondary battery in which the laminate for a secondary battery is used.

Moreover, the present disclosure aims to advantageously solve the problem set forth above, and a presently disclosed secondary battery comprises any one of the laminates for a secondary battery set forth above. By using the laminate for a secondary battery set forth above, the secondary battery can be caused to display excellent battery performance.

Furthermore, the present disclosure aims to advantageously solve the problem set forth above, and a presently disclosed method of producing a laminate for a secondary battery is a method of producing a laminate for a secondary battery that includes a negative electrode; a first separator affixed to one surface of the negative electrode; a positive electrode affixed to a surface of the first separator at an opposite side of the first separator to the negative electrode; and a second separator affixed to another surface of the negative electrode or to a surface of the positive electrode at an opposite side of the positive electrode to the first separator, and in which the positive electrode has a smaller size in plan view than the negative electrode, the first separator, and the second separator, the method of producing a laminate for a secondary battery comprising: a step (A) of producing an affixed body that includes a negative electrode material formed of an elongated negative electrode web or a negative electrode, an elongated first separator web affixed to one surface of the negative electrode material, and an elongated second separator web affixed to another surface of the negative electrode material or an affixed body that includes a negative electrode material formed of an elongated negative electrode web, an elongated first separator web, a positive electrode, and an elongated second separator web affixed in stated order; and a step (B) of cutting the affixed body, wherein the step (A) includes a step (a1) of applying an adhesive material at an affixing surface of the negative electrode material and a separator web that is to be affixed to the negative electrode material, the adhesive material is applied in the step (a1) such that a first coated section including a region where the adhesive material is applied with a coating weight M1 and a second coated section including a region where the adhesive material is applied with a coating weight M2 that is at least 0.02 g/m$^2$ more than the coating weight M1 are located alternately in a longitudinal direction of the affixed body, the affixed body is cut within a range where the second coated section is located in the step (B), and in an obtained laminate for a secondary battery, the positive electrode is located at a position opposite the first coated section. Through the coating weight M2 in the coated region of the second coated section being at least 0.02 g/m$^2$ more than the coating weight M1 in the coated region of the first coated section, which is at a position opposite the positive electrode, and through the affixed body being cut within a range where the second coated section is located in this manner, it is possible to inhibit peeling of a separator from the negative electrode and curling up of the separator at a cut section. Therefore, it is possible to obtain a laminate for a secondary battery in which separator curling up is inhibited.

In the presently disclosed method of producing a laminate for a secondary battery, it is preferable that application of the adhesive material is performed using an inkjet method. When an inkjet method is used, the adhesive material can easily be applied in desired regions with different coating weights.

In the presently disclosed method of producing a laminate for a secondary battery, it is preferable that the adhesive material is not applied at a part that extends along a cutting position where the affixed body is cut in the step (B). When the adhesive material is not applied at a part that extends along the cutting position, it is possible to inhibit attachment of the adhesive material to a cutting tool during cutting of the affixed body and to efficiently produce a laminate for a secondary battery.

In the presently disclosed method of producing a laminate for a secondary battery, it is preferable that the adhesive material is not applied within a range up to 1,000 μm at both sides in a longitudinal direction from a cutting position where the affixed body is cut in the step (B). When the adhesive material is not applied within a range up to 1,000 μm from the cutting position at both sides in the longitudinal direction, it is possible to inhibit attachment of the adhesive material to a cutting tool during cutting of the affixed body and to efficiently produce a laminate for a secondary battery.

In the presently disclosed method of producing a laminate for a secondary battery, it is preferable that the coating weight M1 is not less than 0.01 g/m$^2$ and not more than 3.00 g/m$^2$. When the coating weight M1 is not less than 0.01 g/m$^2$ and not more than 3.00 g/m$^2$, sufficient adhesive strength can be ensured while also inhibiting increased internal resistance of a secondary battery in which the laminate for a secondary battery is used.

Also, the present disclosure aims to advantageously solve the problem set forth above, and a presently disclosed method of producing a secondary battery comprises: a step of producing a plurality of laminates for a secondary battery using the method of producing a laminate for a secondary battery set forth above; a step of stacking the laminates for a secondary battery that are obtained to obtain a stack; and a step of housing the stack in a battery container. By using laminates for a secondary battery that are produced using the method of producing a laminate for a secondary battery set forth above in this manner, it is possible to produce a secondary battery that can display excellent battery performance.

Advantageous Effect

According to the present disclosure, it is possible to obtain a laminate for a secondary battery in which separator curling up is inhibited.

Moreover, according to the present disclosure, it is possible to obtain a secondary battery that can display excellent battery performance using a laminate for a secondary battery in which separator curling up is inhibited.

DETAILED DESCRIPTION

Figure 1A:
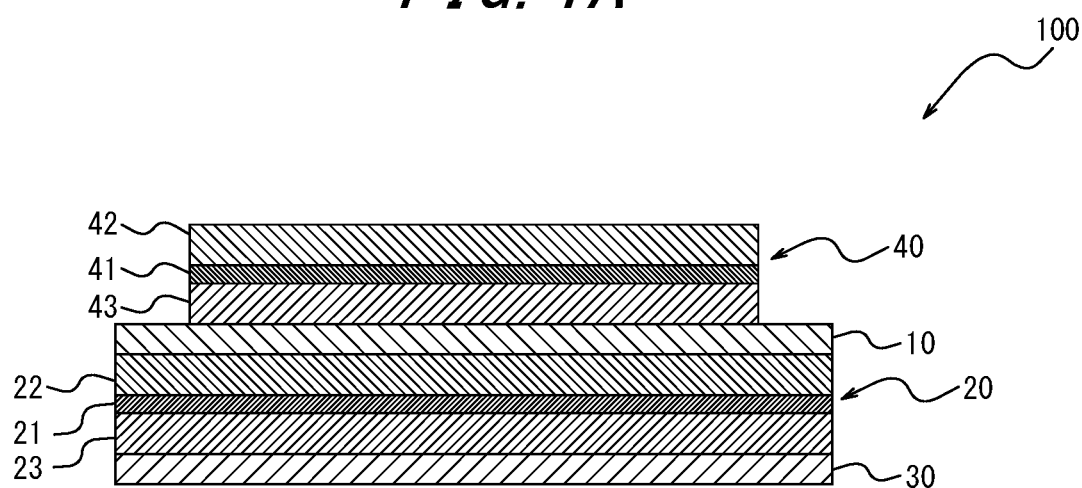
FIG. 1A is a front view illustrating the structure of one example of a laminate for a secondary battery.

The following describes the presently disclosed laminate for a secondary battery and method of producing a laminate for a secondary battery with reference to the drawings. Note that the dimensions of some members in the drawings are enlarged or reduced in order to facilitate understanding.

The presently disclosed method of producing a laminate for a secondary battery can be used in production of the presently disclosed laminate for a secondary battery. Moreover, the presently disclosed secondary battery can be produced by the presently disclosed method of producing a secondary battery, for example, and a feature thereof is that the presently disclosed laminate for a secondary battery is used therein.

Figure 1B:
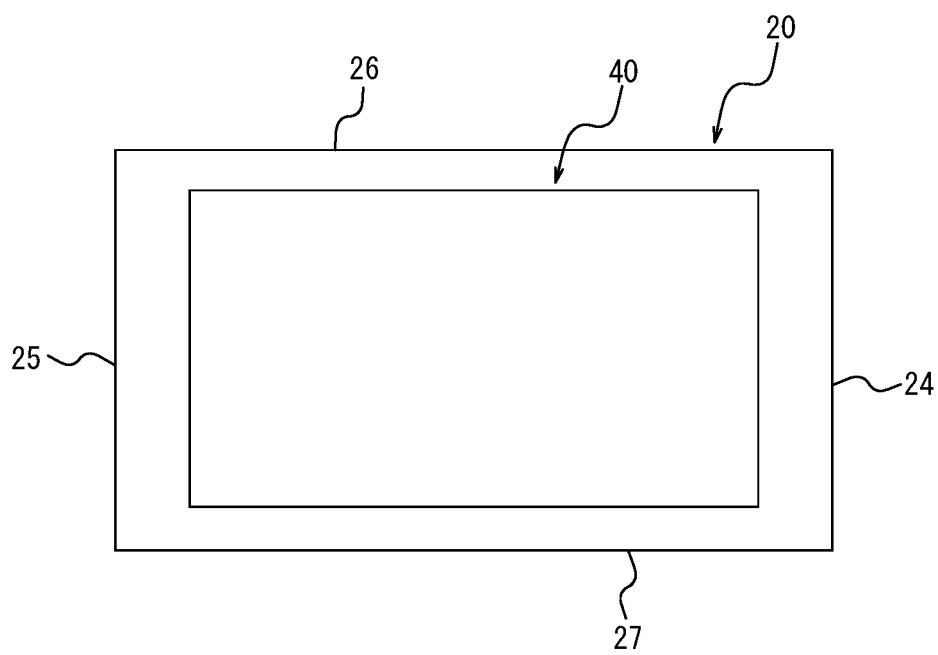
FIG. 1B is a plan view for describing a positional relationship of a negative electrode and a positive electrode in the laminate for a secondary battery illustrated in FIG. 1A.
Figure 2:
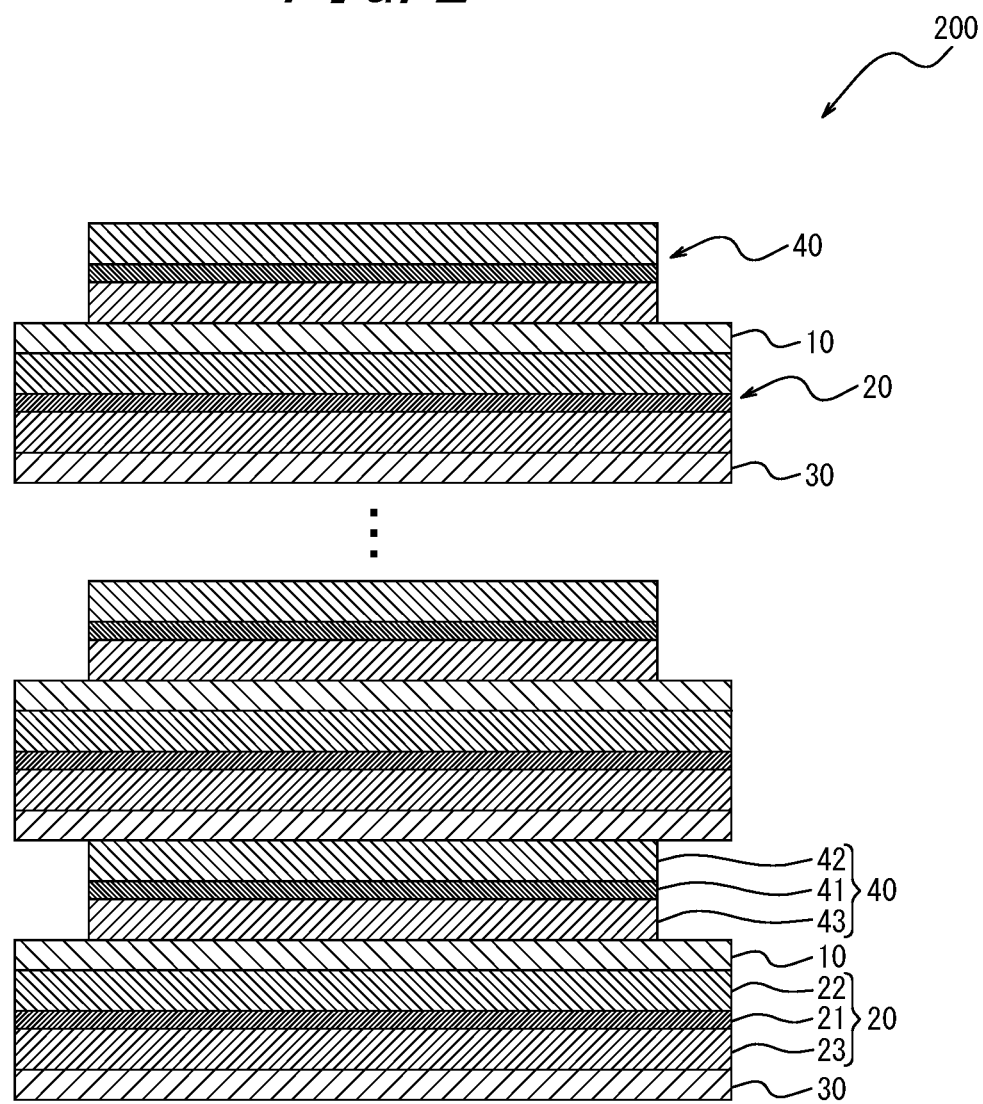
FIG. 2 is a front view illustrating the structure of one example of a stack obtained through stacking of laminates for a secondary battery.
Figure 3:
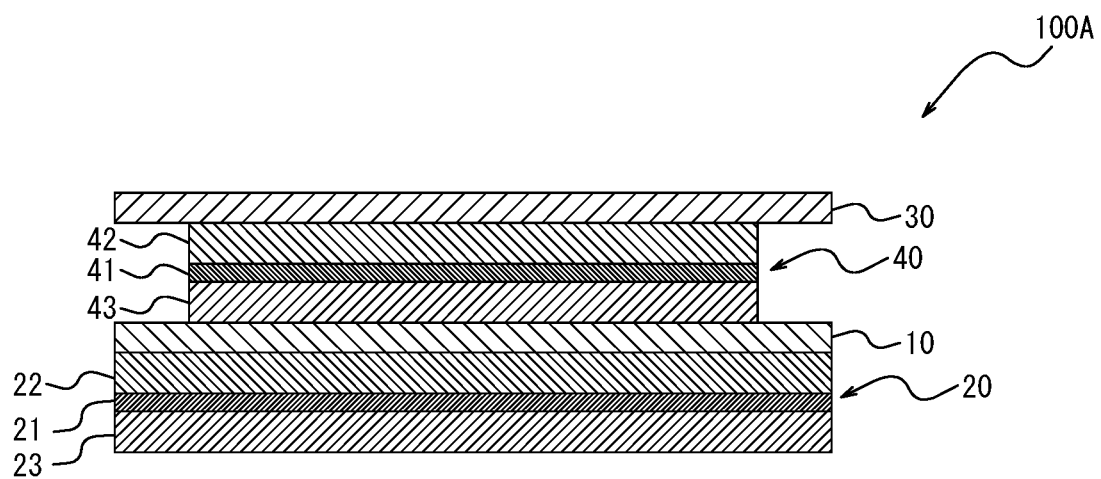
FIG. 3 is a front view illustrating the structure of another example of a laminate for a secondary battery.

Note that the presently disclosed laminate for a secondary battery and a laminate for a secondary battery obtained using the presently disclosed method of producing a laminate for a secondary battery may have a structure such as illustrated in FIGS. 1A and 1B or a structure such as illustrated in FIG. 3, for example. Moreover, the laminate for a secondary battery may be stacked to obtain a stack 200 as illustrated in FIG. 2, for example, and can then be used in a stacked secondary battery or the like.

A laminate for a secondary battery 100 illustrated in the front view of FIG. 1A includes a negative electrode 20, a first separator 10 affixed to one surface (upper surface in FIG. 1A) of the negative electrode 20, a positive electrode 40 affixed to a surface of the first separator 10 at the opposite side thereof (upper side in FIG. 1A) to the negative electrode 20, and a second separator 30 affixed to the other surface of the negative electrode 20. In this example, the first separator 10, the negative electrode 20, the second separator 30, and the positive electrode 40 each have a rectangular shape in plan view. The negative electrode 20 has a structure in which negative electrode mixed material layers 22 and 23 containing a negative electrode active material have been formed at both surfaces of a negative electrode current collector 21. The positive electrode 40 has a structure in which positive electrode mixed material layers 42 and 43 containing a positive electrode active material have been formed at both surfaces of a positive electrode current collector 41. The positive electrode 40 has a smaller size in plan view than the negative electrode 20, the first separator 10, and the second separator 30 and, as illustrated by the plan view positional relationship of the negative electrode 20 and the positive electrode 40 in FIG. 1B, the positive electrode 40 is located between a first edge 24 and a second edge 25 of the negative electrode 20 that are in opposition in an orthogonal direction (left/right direction in FIG. 1B) to the stacking direction and also between a third edge 26 and a fourth edge 27 of the negative electrode 20 that extend in the left/right direction in FIG. 1B and are orthogonal to the first edge 24 and the second edge 25.

A laminate for a secondary battery 100A illustrated in the front view of FIG. 3 has the same configuration as the laminate for a secondary battery 100 illustrated in FIGS. 1A and 1B with the exception that the second separator 30 is affixed to a surface of the positive electrode 40 at the opposite side thereof (upper side in FIG. 3) to the first separator 10 instead of being affixed to the other surface of the negative electrode 20.

It should be noted, however, that the presently disclosed laminate for a secondary battery and a laminate for a secondary battery obtained using the presently disclosed method of producing a laminate for a secondary battery are not limited to the examples illustrated in FIGS. 1A and 1B and FIG. 3. For example, the first separator 10 and the second separator 30 may have a larger size in plan view than the negative electrode 20 in the laminate for a secondary battery. By using a laminate for a secondary battery in which the first separator 10 and the second separator 30 are larger than the negative electrode 20, it is possible to further increase the margin of safety with regards to short circuiting when electrode misalignment occurs in a secondary battery.

The following describes the presently disclosed method of producing a laminate for a secondary battery, method of producing a secondary battery, laminate for a secondary battery, and secondary battery in order.

(Method of producing laminate for secondary battery)
The presently disclosed method of producing a laminate for a secondary battery includes a step (A) of producing an affixed body and a step (B) of cutting the affixed body and, in a case in which the affixed body produced in the step (A) does not include a positive electrode, may optionally further include a step (C) of affixing a positive electrode to a cut body obtained through cutting of the affixed body in the step (B).

<Step (A)>
The affixed body produced in the step (A) may be (I) or (II) described below.

(I) An affixed body (hereinafter, also referred to as "affixed body (I)") that includes a negative electrode material formed of an elongated negative electrode web or a negative electrode, an elongated first separator web affixed to one surface of the negative electrode material, and an elongated second separator web affixed to the other surface of the negative electrode material, and optionally includes a positive electrode affixed to a surface of the first separator web at the opposite side thereof to the negative electrode material (II) An affixed body (hereinafter, also referred to as "affixed body (II)") that includes a negative electrode material formed of an elongated negative electrode web, an elongated first separator web, a positive electrode, and an elongated second separator web affixed in stated order A laminate for a secondary battery that includes a negative electrode, a first separator affixed to one surface of the negative electrode, a positive electrode affixed to a surface of the first separator at the opposite side thereof to the negative electrode, and a second separator affixed to the other surface of the negative electrode such as illustrated in FIGS. 1A and 1B, for example, is normally obtained in the presently disclosed method of producing a laminate for a secondary battery in a case in which the affixed body (I) is produced in the step (A).

Also note that in a case in which the affixed body (I) does not include a positive electrode, the step (C) is normally performed after the step (B) in the presently disclosed method of producing a laminate for a secondary battery in order to produce a laminate for a secondary battery.

Moreover, a laminate for a secondary battery that includes a negative electrode, a first separator affixed to one surface of the negative electrode, a positive electrode affixed to a surface of the first separator at the opposite side thereof to the negative electrode, and a second separator affixed to a surface of the positive electrode at the opposite side thereof to the first separator such as illustrated in FIG. 3, for example, is normally obtained in the presently disclosed method of producing a laminate for a secondary battery in a case in which the affixed body (II) is produced in the step (A).

Production of an affixed body in the step (A) is normally carried out by applying an adhesive material at an affixing surface of members that are to be affixed to each other, and then affixing members of the affixed body to each other via the adhesive material. In other words, the step (A) includes a step (a1) of applying an adhesive material at an affixing surface of a negative electrode material and a separator web that is to be affixed to the negative electrode material and can further include a step (a2) of applying an adhesive material at an affixing surface of a separator web and a positive electrode.

Note that the "separator web that is to be affixed to the negative electrode material" is a first separator web and a second separator web in a case in which the affixed body that is to be produced is the affixed body (I) and is a first separator web in a case in which the affixed body that is to be produced is the affixed body (II). Moreover, the member onto which the adhesive material is applied may be just one of the members that are to be adhered to each other or may be both of the members that are to be adhered to each other.

Figure 4A:
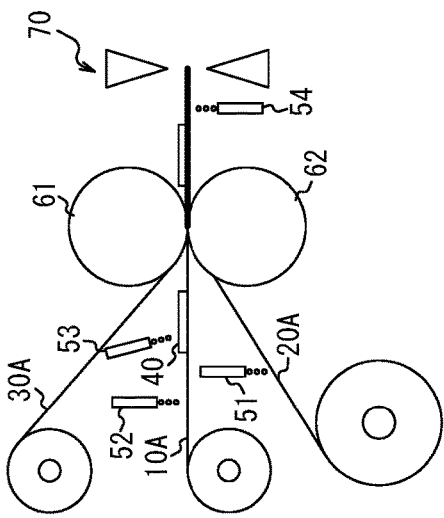
FIGS. 4A to 4D are explanatory diagrams each illustrating an example of a production process of a laminate for a secondary battery.
Figure 4B:
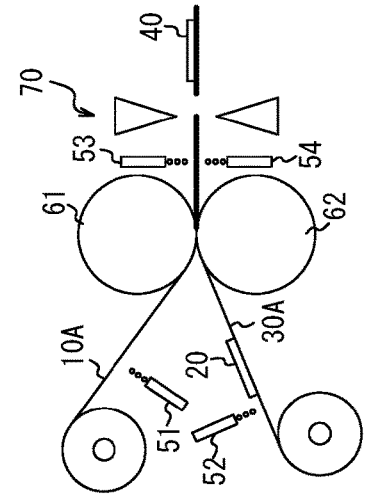
Figure 4C:
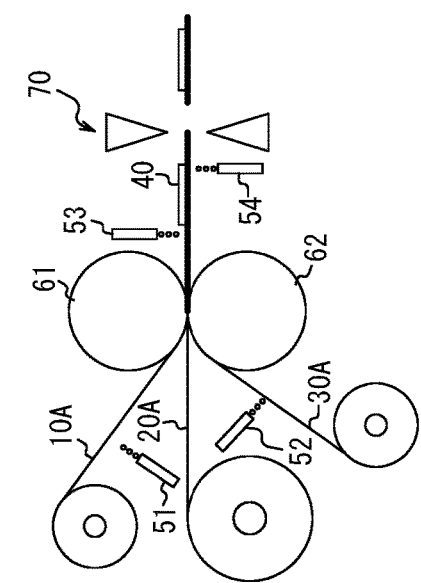
Figure 4D:
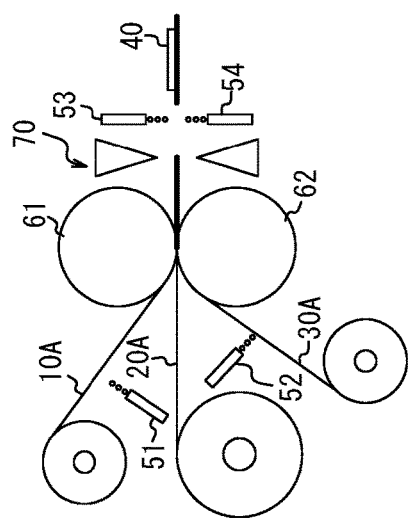

Specifically, the affixed body (I) can be produced as illustrated in FIG. 4A, 4B, or 4D, for example, in the step (A).

Moreover, the affixed body (II) can be produced as illustrated in FIG. 4C, for example, in the step (A).

In FIG. 4A, an elongated first separator web 10A that has been fed from a first separator web roll is affixed to one surface of a negative electrode material formed of an elongated negative electrode web 20A that has been fed from a negative electrode web roll via an adhesive material that has been supplied from a coating machine 51, and an elongated second separator web 30A that has been fed from a second separator web roll is affixed to the other surface of the negative electrode material formed of the negative electrode web 20A via an adhesive material that has been supplied from a coating machine 52. Note that the affixing can be performed using pressure bonding rollers 61 and 62, for example. Positive electrodes 40 are affixed at a specific arrangement pitch to a surface of the first separator web 10A at the opposite side thereof to the negative electrode web 20A via an adhesive material that has been supplied from a coating machine 53, and, in this manner, an affixed body (I) that includes a positive electrode is obtained.

Note that in FIG. 4A, an adhesive material is supplied from a coating machine 54 to a surface of the second separator web 30A at the opposite side thereof to the negative electrode web 20A so that when laminates for a secondary battery obtained by cutting the affixed body between positive electrodes 40 that are adjacent in the longitudinal direction are stacked in order to produce a stack, the laminates for a secondary battery can be well adhered to each other.

In FIG. 4B, an elongated first separator web 10A that has been fed from a first separator web roll is affixed to one surface of a negative electrode material formed of an elongated negative electrode web 20A that has been fed from a negative electrode web roll via an adhesive material that has been supplied from a coating machine 51, and an elongated second separator web 30A that has been fed from a second separator web roll is affixed to the other surface of the negative electrode material formed of the negative electrode web 20A via an adhesive material that has been supplied from a coating machine 52 to obtain an affixed body (I) that does not include a positive electrode. The affixing can be performed using pressure bonding rollers 61 and 62, for example.

Note that in FIG. 4B, the affixed body is cut and then a positive electrode 40 is affixed to an obtained cut body via an adhesive material that has been supplied from a coating machine 53 (step (C)). Moreover, in FIG. 4B, an adhesive material is supplied from a coating machine 54 to a surface of the cut body at the opposite side thereof to where the positive electrode 40 is to be affixed so that when laminates for a secondary battery obtained by affixing positive electrodes to cut bodies are stacked in order to produce a stack, the laminates for a secondary battery can be well adhered to each other.

In FIG. 4C, an elongated first separator web 10A that has been fed from a first separator web roll is affixed to one surface of a negative electrode material formed of an elongated negative electrode web 20A that has been fed from a negative electrode web roll via an adhesive material that has been supplied from a coating machine 51, positive electrodes 40 are affixed to a surface of the first separator web 10A at the opposite side thereof to the negative electrode web 20A via an adhesive material that has been supplied from a coating machine 52, and an elongated second separator web 30A that has been fed from a second separator web roll is affixed to a surface of the first separator web 10A and the positive electrodes 40 at the opposite side thereof to the negative electrode web 20A via an adhesive material that has been supplied from a coating machine 53 to obtain an affixed body (II). The affixing can be performed using pressure bonding rollers 61 and 62, for example.

Note that in FIG. 4C, an adhesive material is supplied from a coating machine 54 to a surface of the negative electrode web 20A at the opposite side thereof to the first separator web 10A so that when laminates for a secondary battery obtained by cutting the affixed body are stacked in order to produce a stack, the laminates for a secondary battery can be well adhered to each other.

In FIG. 4D, negative electrode materials formed of negative electrodes 20 are affixed at a specific arrangement pitch to one surface of an elongated second separator web 30A that has been fed from a second separator web roll via an adhesive material that has been supplied from a coating machine 52, and an elongated first separator web 10A that has been fed from a first separator web roll is affixed to one surface of the negative electrode materials formed of the negative electrodes 20 and the second separator web 30A via an adhesive material that has been supplied from a coating machine 51 to obtain an affixed body (I) that does not include a positive electrode. The affixing can be performed using pressure bonding rollers 61 and 62, for example.

Note that in FIG. 4D, the affixed body is cut and then a positive electrode 40 is affixed to an obtained cut body via an adhesive material that has been supplied from a coating machine 53 (step (C)). Moreover, in FIG. 4D, an adhesive material is supplied from a coating machine 54 to a surface of the second separator web 30A at the opposite side thereof to the negative electrodes 20 so that when laminates for a secondary battery obtained by affixing positive electrodes to cut bodies are stacked in order to produce a stack, the laminates for a secondary battery can be well adhered to each other.

Note that the method by which an affixed body is produced in the step (A) is not limited to the examples described above. For example, in FIGS. 4A, 4C, and 4D, the affixed body may be cut and then an adhesive material may be supplied to an obtained cut body from the coating machine 54. Moreover, in FIG. 4D, positive electrodes 40 may be affixed at a specific arrangement pitch to a surface of the first separator web 10A at the opposite side thereof to the negative electrodes 20 via an adhesive material that has been supplied from the coating machine 53 so as to obtain an affixed body (I) that includes a positive electrode.

[Negative Electrode Material and Positive Electrode]

An electrode that is obtained by cutting an elongated electrode web (negative electrode web or positive electrode web) can be used as an electrode (negative electrode or positive electrode) without any specific limitations. Moreover, an electrode web that is formed of an electrode substrate having an electrode mixed material layer (negative electrode mixed material layer or positive electrode mixed material layer) formed at one surface or both surfaces of an elongated current collector or an electrode web that has a porous membrane layer further formed on an electrode mixed material layer of an electrode substrate can be used as an electrode web (negative electrode web or positive electrode web).

Note that any current collector, electrode mixed material layer, and porous membrane layer that can be used in the field of secondary batteries, such as any of those described in JP2013-145763A, can be used as the current collector, electrode mixed material layer, and porous membrane layer without any specific limitations. The porous membrane layer is a layer that contains non-conductive particles such as described in JP2013-145763A, for example.

[Separator Web]

A separator web that is formed of an elongated separator substrate or a separator web that has a porous membrane layer formed at one surface or both surfaces of an elongated separator substrate can, for example, be used as a separator web without any specific limitations.

Note that any separator substrate and porous membrane layer that can be used in the field of secondary batteries, such as any of those described in JP2012-204303A and JP2013-145763A, can be used as the separator substrate and the porous membrane layer without any specific limitations.

[Adhesive Material]

Any adhesive material that is used in the field of secondary batteries can be used as the adhesive material without any specific limitations so long as it does not impair battery reactions. In particular, an adhesive material formed of a polymer is preferable as the adhesive material. Note that the adhesive material may be formed of just one type of polymer or may be formed of two or more types of polymers.

Examples of polymers that can be used as the adhesive material include, but are not specifically limited to, fluoropolymers such as polyvinylidene fluoride and polyvinylidene fluoride-hexafluoropropylene (PVdF-HFP) copolymer; conjugated diene polymers such as styrene-butadiene copolymer (SBR) and acrylonitrile-butadiene copolymer (NBR); hydrogenated products of conjugated diene polymers; polymers that include a (meth)acrylic acid alkyl ester monomer unit (acrylic polymers); and polyvinyl alcohol polymers such as polyvinyl alcohol (PVA).

Note that in the present disclosure, "(meth)acrylic acid" is used to indicate "acrylic acid" and/or "methacrylic acid".

The form of the adhesive material formed of a polymer is not specifically limited and may be a particulate form, a non-particulate form, or a combination of a particulate form and a non-particulate form.

Note that in a case in which the adhesive material formed of a polymer has a particulate form, the particulate adhesive material may be monophase structure particles that are formed from a single polymer or may be heterophase structure particles that are formed through physical or chemical bonding of two or more different polymers. Specific examples of heterophase structures include a core-shell structure in which a central portion (core portion) and an outer shell (shell portion) of a spherical particle are formed from different polymers; and a side-by-side structure in which two or more polymers are disposed alongside each other. Note that the term "core-shell structure" as used in the present disclosure is inclusive of a structure in which a shell portion completely covers an outer surface of a core portion and also of a structure in which a shell portion partially covers an outer surface of a core portion. In terms of external appearance, even in a situation in which the outer surface of a core portion appears to be completely covered by a shell portion, the shell portion is still considered to be a shell portion that partially covers the outer surface of the core portion so long as pores are formed that pass between inside and outside of the shell portion.

The adhesive material can be supplied to an affixing surface in any state, such as a solid state, a molten state, a dissolved state in a solvent, or a dispersed state in a solvent. In particular, it is preferable that the adhesive material is supplied in a dissolved state in a solvent or a dispersed state in a solvent, and more preferable that the adhesive material is supplied in a dispersed state in a solvent.

In a case in which the adhesive material is supplied to an affixing surface in a dissolved state in a solvent or a dispersed state in a solvent (i.e., in a case in which a composition for adhesion containing the adhesive material and a solvent is supplied to the affixing surface), the solvent of the composition for adhesion can be water, an organic solvent, or a mixture thereof, for example, without any specific limitations. Examples of organic solvents that can be used include, but are not specifically limited to, alicyclic hydrocarbons such as cyclopentane and cyclohexane; aromatic hydrocarbons such as toluene and xylene; ketones such as ethyl methyl ketone and cyclohexanone; esters such as ethyl acetate, butyl acetate, γ-butyrolactone, and ε-caprolactone; nitriles such as acetonitrile and propionitrile; ethers such as tetrahydrofuran and ethylene glycol diethyl ether; and alcohols such as methanol, ethanol, isopropanol, ethylene glycol, and ethylene glycol monomethyl ether.

Of the examples given above, water and alcohols are preferable as the solvent from a viewpoint of efficiently producing a laminate for a secondary battery, and water is more preferable.

Application of the adhesive material using a coating machine can be performed by a known application method such as an inkjet, spraying, dispensing, gravure coating, or screen printing method. Of these application methods, it is preferable that the adhesive material is applied using an inkjet method from a viewpoint of enabling simple adjustment of the amount and range of application of the adhesive material.

The adhesive material may be applied over the entirety of the affixing surface or may be applied to only part of the affixing surface. In a case in which the adhesive material is applied to only part of the affixing surface, the adhesive material can be applied such as to have any shape in plan view, such as a striped shape, a dotted shape, or a lattice shape, without any specific limitations. Of these shapes, application of the adhesive material with a dotted shape is preferable from a viewpoint of increasing injectability of electrolyte solution in production of a secondary battery using a laminate for a secondary battery. Moreover, the dotted adhesive material may be disposed (applied) uniformly over the entirety of the affixing surface or may be disposed (applied) in an array such as to have a specific pattern such as a striped pattern, a dotted pattern, or a lattice pattern. Note that in a case in which a fine dotted adhesive material is to be arranged in a specific pattern, it is preferable that the adhesive material is applied by an inkjet method from a viewpoint of ease of application and arrangement of the adhesive material.

The cross-sectional shape of the adhesive material may be a protruding shape, a depressed/protruding shape, or a depressed shape without any specific limitations, of which, a depressed/protruding shape is preferable. Note that the cross-sectional shape of the adhesive material can be altered by adjusting the drying conditions in application of the adhesive material, for example.

[Step (a1)]

In the step (a1) in which an adhesive material is applied at an affixing surface of a negative electrode material and a separator web that is to be affixed to the negative electrode material, it is a requirement that the adhesive material is applied such that a first coated section including a region where the adhesive material has been applied with a coating weight M1 and a second coated section including a region where the adhesive material has been applied with a coating weight M2 that is at least 0.02 g/m$^2$ more than the coating weight M1 are located alternately in the longitudinal direction of the affixed body.

—First Coated Section—

The first coated section is a part corresponding to a position where a positive electrode is located in a laminate for a secondary battery that is produced using the affixed body. In other words, in a laminate for a secondary battery produced according to the presently disclosed method of producing a laminate for a secondary battery, the first coated section is a part where a positive electrode is projected (projected section) when the positive electrode is projected in the stacking direction. Moreover, the first coated section includes a region (coated region) where the adhesive material has been applied with a coating weight M1.

Note that the coated region of the first coated section may be the entirety of the first coated section or may be part of the first coated section.

The coating weight M1 in the coated region of the first coated section is preferably not less than 0.01 g/m$^2$ and not more than 3.00 g/m$^2$, more preferably not less than 0.01 g/m$^2$ and not more than 0.20 g/m$^2$, and even more preferably not less than 0.01 g/m$^2$ and not more than 0.05 g/m$^2$. When the coating weight M1 is not less than the lower limit set forth above, the negative electrode material and the separator web can be well adhered. Moreover, when the coating weight M1 is not more than any of the upper limits set forth above, increased internal resistance of a secondary battery can be inhibited, and injectability of electrolyte solution can be increased.

In a case in which the adhesive material is applied in a dotted shape, the average thickness of dots formed in the coated region of the first coated section is preferably not less than 0.2 μm and not more than 3.0 μm. When the average thickness of the dots is not less than the lower limit set forth above, the negative electrode material and the separator web can be well adhered. Moreover, when the average thickness of the dots is not more than the upper limit set forth above, increased internal resistance of a secondary battery can be inhibited.

Moreover, in a case in which the adhesive material is applied in a dotted shape, the arrangement pitch of dots formed in the coated region of the first coated section (i.e., the distance between centers of the dots in plan view) is preferably not less than 100 μm and not more than 1,000 μm and more preferably not less than 200 μm and not more than 700 μm. When the arrangement pitch of the dots is not less than any of the lower limits set forth above, increased internal resistance of a secondary battery can be inhibited, and injectability of electrolyte solution can be increased. Moreover, when the arrangement pitch of the dots is not more than any of the upper limits set forth above, the negative electrode material and the separator web can be well adhered.

—Second Coated Section—

The second coated section is located between first coated sections that are adjacent in the longitudinal direction of the affixed body. The affixed body is normally cut within a range where the second coated section is located. The second coated section includes a region (coated region) where the adhesive material has been applied with a coating weight M2.

Note that the coated region of the second coated section may be the entirety of the second coated section or may be part of the second coated section.

The coating weight M2 in the coated region of the second coated section is required to be at least 0.02 g/m$^2$ more than the coating weight M1 in the coated region of the first coated section, and the difference (M2−M1) between the coating weight M2 and the coating weight M1 is preferably 0.10 g/m$^2$ or more, and more preferably 0.20 g/m$^2$ or more, and is preferably 0.50 g/m$^2$ or less, and more preferably 0.25 g/m$^2$ or less. When the difference (M2−M1) between the coating weight M2 and the coating weight M1 is not at least 0.02 g/m$^2$, it is not possible to sufficiently inhibit peeling of a separator from a negative electrode and curling up of the separator at a cut section during cutting of the affixed body. Moreover, when the difference (M2−M1) between the coating weight M2 and the coating weight M1 is within any of the ranges set forth above, curling up of a separator during cutting can be sufficiently inhibited while also inhibiting increased internal resistance of a secondary battery.

In a case in which the adhesive material is applied in a dotted shape, the average thickness of dots formed in the coated region of the second coated section is preferably 0.2 µm or more, and more preferably 0.5 µm or more. When the average thickness of the dots is not less than any of the lower limits set forth above, curling up of a separator during cutting can be sufficiently inhibited.

Moreover, in a case in which the adhesive material is applied in a dotted shape, the arrangement pitch of dots formed in the coated region of the second coated section (i.e., the distance between centers of the dots in plan view) is preferably not less than 100 µm and not more than 500 µm, and more preferably not less than 100 µm and not more than 200 µm. When the arrangement pitch of the dots is not more than any of the upper limits set forth above, curling up of a separator during cutting can be sufficiently inhibited.

Figure 5:
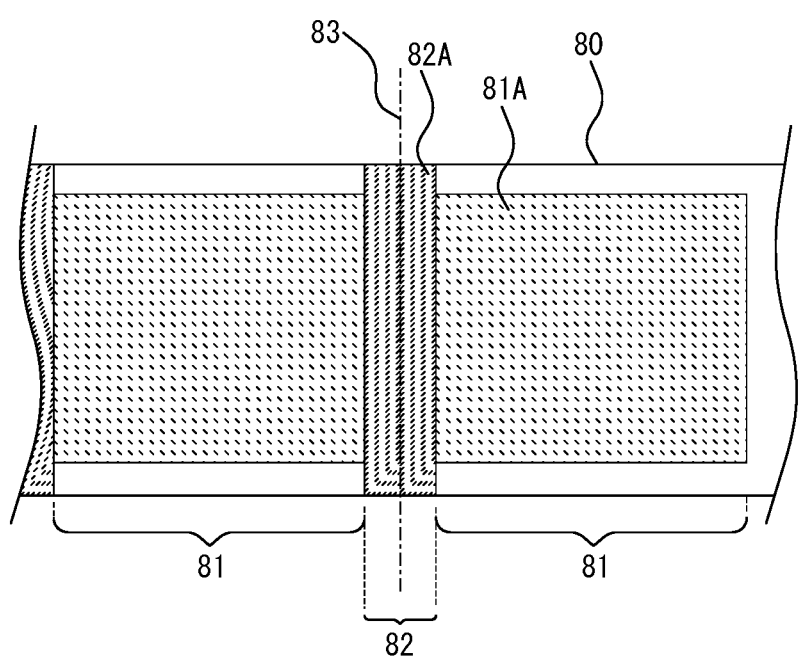
FIG. 5 is a plan view illustrating one example of an affixing surface of an affixed body where an adhesive material has been applied.
Figure 6A:
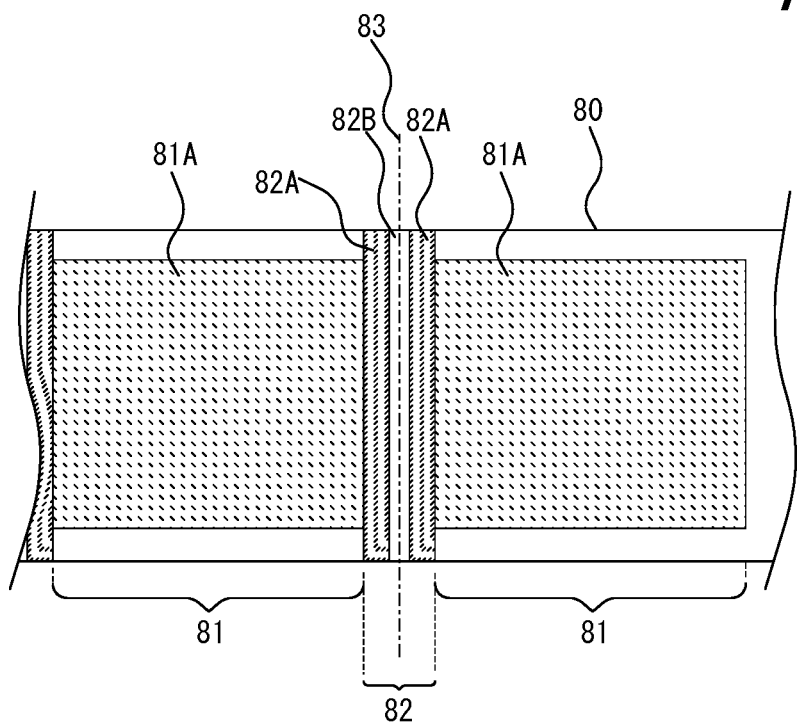
FIGS. 6A and 6B are plan views each illustrating another example of an affixing surface of an affixed body where an adhesive material has been applied.
Figure 6B:
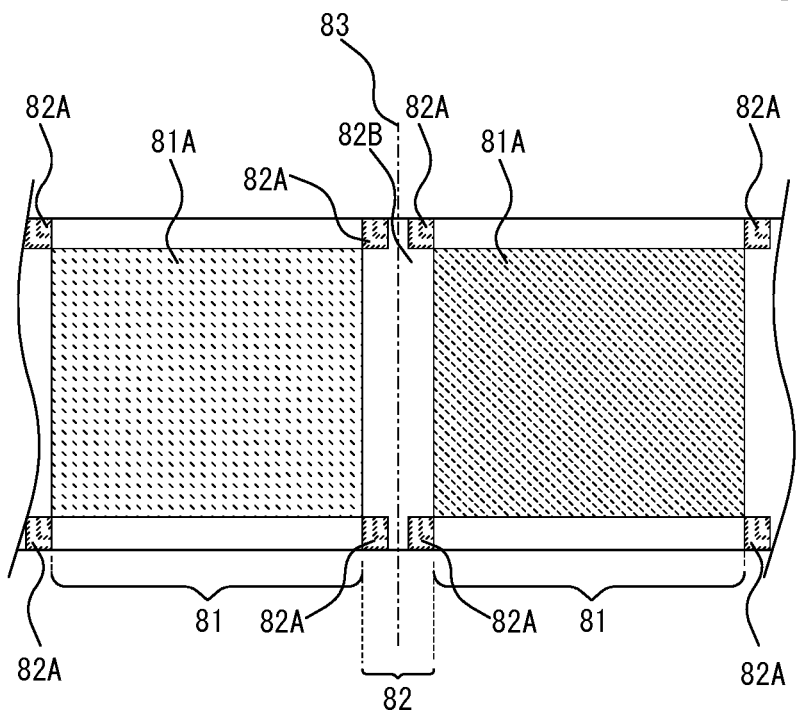

Although no specific limitations are placed on the shapes and ranges of the coated regions of the first coated section and the second coated section, shapes and ranges such as illustrated in FIG. 5, FIG. 6A, and FIG. 6B, for example, can be adopted.

An affixing surface 80 illustrated in FIG. 5 has an elongated rectangular shape and has first coated sections 81 and second coated sections 82 disposed alternately in the longitudinal direction (left/right direction in FIG. 5).

A coated region 81A of each first coated section 81 is disposed throughout the entirety of the first coated section (entirety of a part where a positive electrode is projected when the positive electrode is projected in a stacking direction). Note that although the adhesive material is not applied at parts of the first coated section 81 located at both sides in a width direction (up/down direction in FIG. 5) of the affixing surface 80 in the illustrated example, any amount of the adhesive material may be applied at these parts.

Moreover, a coated region 82A of each second coated section 82 is disposed throughout the entirety of the second coated section (between first coated sections 81 and across the entirety of the width direction of the affixing surface 80), inclusive of a cutting position 83 in the subsequently described step (B).

By providing the coated region 82A throughout the entirety of the second coated section 82, curling up of a separator during cutting can be sufficiently inhibited.

An affixing surface 80 illustrated in FIG. 6A has the same configuration as the affixing surface illustrated in FIG. 5 with the exception that the range of the coated region 82A of the second coated section 82 is different.

A coated region 82A of each second coated section 82 of the affixing surface 80 illustrated in FIG. 6A sandwiches a cutting position 83 at both sides in the longitudinal direction of the affixing surface 80 and is disposed across the entirety of the width direction of the affixing surface 80. In other words, in each second coated section 82 of the affixing surface 80 illustrated in FIG. 6A, the adhesive material is not applied at a part 82B that extends along the cutting position.

By not applying the adhesive material at the part 82B that extends along the cutting position in this manner, it is possible to inhibit attachment of the adhesive material to a cutting tool used in cutting and shortening of the service life of the cutting tool.

Note that from a viewpoint of inhibiting attachment of the adhesive material to a cutting tool while also sufficiently inhibiting curling up of the separator during cutting, the range where the adhesive material is not applied is preferably a range up to 1,000 µm from the cutting position 83 at both sides in the longitudinal direction, and more preferably a range up to 200 µm from the cutting position 83 at both sides in the longitudinal direction.

An affixing surface 80 illustrated in FIG. 6B has the same configuration as the affixing surface illustrated in FIG. 6A with the exception that the range of the coated region 82A in the width direction of the affixing surface 80 is different.

A coated region 82A of each second coated section 82 of the affixing surface 80 illustrated in FIG. 6B sandwiches a cutting position 83 at both sides in the longitudinal direction of the affixing surface 80 and is disposed at both width direction ends of the affixing surface 80. In other words, in each second coated section 82 of the affixing surface 80 illustrated in FIG. 6B, the adhesive material is not applied at a part 82B that extends along the cutting position, and the coated region 82A is only disposed at four corners of the second coated section 82.

By not applying the adhesive material at the part 82B that extends along the cutting position in this manner, it is possible to inhibit attachment of the adhesive material to a cutting tool used in cutting and shortening of the service life of the cutting tool.

Note that from a viewpoint of inhibiting attachment of the adhesive material to a cutting tool while also sufficiently inhibiting curling up of a separator during cutting, the range where the adhesive material is not applied is preferably a range up to 1,000 µm from the cutting position 83 at both sides in the longitudinal direction, and more preferably a range up to 200 µm from the cutting position 83 at both sides in the longitudinal direction.

Of the examples described above, it is preferable that the shapes and ranges of the coated regions of the first coated section and the second coated section are set as shapes and ranges such as illustrated in FIG. 6A or 6B from a viewpoint of inhibiting attachment of the adhesive material to a cutting tool while also sufficiently inhibiting curling up of a separator during cutting.

[Step (a2)]

In the step (a2) that can optionally be performed, an adhesive material is applied at an affixing surface of a separator web and a positive electrode.

Specifically, an adhesive material is applied at an affixing surface of a separator web and a positive electrode in the step (a2) in a case in which an affixed body including a positive electrode is to be produced in the step (A) (for example, refer to FIG. 4A and FIG. 4C) and in a case in which an affixed body having an adhesive material pre-applied at a position where a positive electrode is to be affixed after cutting (affixed body not including a positive electrode) is to be produced in the step (A) (for example, refer to FIG. 4D).

Specifically, in FIG. 4A, for example, an adhesive material is applied from the coating machine 53 to an affixing surface of the first separator web 10A and the positive electrode 40. Moreover, in FIG. 4C, for example, an adhesive material is applied from the coating machine 52 and the coating machine 53 to an affixing surface of the first separator web 10A and the positive electrode 40 and an affixing surface of the second separator web 30A and the positive electrode 40. Furthermore, in FIG. 4D, for example, an adhesive material is applied from the coating machine 53 to a surface of the first separator web 10A where the positive electrode 40 is to be affixed after cutting (upper surface in FIG. 4D).

Although the shapes and ranges of coated regions when the adhesive material is applied to the affixing surface of a separator web and a positive electrode in the step (a2) can be any shapes and ranges so long as the positive electrode and the separator web can be affixed, from a viewpoint of inhibiting attachment of the adhesive material to a cutting tool used in cutting and shortening of the service life of the cutting tool, it is preferable that the adhesive material is not applied at a part that extends along a cutting position where cutting is performed in the step (B), more preferable that the adhesive material is not applied within a range up to 1,000 µm from the cutting position at both sides in the longitudinal direction, and even more preferable that the adhesive material is not applied within a range up to 200 µm from the cutting position at both sides in the longitudinal direction.

In other words, the affixed body produced in the step (A) preferably does not have the adhesive material applied at a part that extends along a cutting position where cutting is performed in the step (B), more preferably does not have the adhesive material applied within a region up to 1,000 µm from the cutting position at both sides in the longitudinal direction, and even more preferably does not have the adhesive material applied within a range up to 200 µm from the cutting position at both sides in the longitudinal direction.

Moreover, from a viewpoint of facilitating setting of the coating range of a coating machine, the shapes and ranges of coated regions when the adhesive material is applied at the affixing surface of a separator web and a positive electrode are preferably the same as the shapes and ranges of coated regions of the adhesive material for the affixing surface of a negative electrode and a separator web in the step (a1). In other words, the shapes and ranges of coated regions in the step (a1) preferably coincide with the shapes and ranges of coated regions in the step (a2) when projected in the stacking direction. Moreover, the coating weights in corresponding coated regions are preferably the same in the step (a1) and the step (a2).

Note that in a case in which the affixed body (II), which has a part where separator webs are adhered to each other between the cutting position and an edge of the positive electrode 40 when viewed in the longitudinal direction of the affixed body, is to be produced, peeling apart of separators can be inhibited through the shapes and ranges of coated regions in the step (a2) being the same as the shapes and ranges of coated regions in the step (a1).

Note that in the step (A), an adhesive material may be supplied to one surface of the affixed body as illustrated in FIGS. 4A, 4C, and 4D (surface of second separator web 30A at opposite side thereof to negative electrode material (negative electrode web 20A or negative electrode 20) in FIGS. 4A and 4D; surface of negative electrode web 20A at opposite side thereof to first separator web 10A in FIG. 4C), for example, so that when laminates for a secondary battery are stacked in order to produce a stack, the laminates for a secondary battery can be well adhered to each other. In such a situation, the shapes and ranges of coated regions when the adhesive material is applied onto one surface of the affixed body can be any shapes and ranges that enable affixing of laminates for a secondary battery to each other. However, from a viewpoint of inhibiting attachment of the adhesive material to a cutting tool used in cutting and shortening of the service life of the cutting tool, it is preferable that the adhesive material is not applied at a part that extends along a cutting position where cutting is performed in the step (B), more preferable that the adhesive material is not applied within a range up to 1,000 µm from the cutting position at both sides in the longitudinal direction, and even more preferable that the adhesive material is not applied within a range up to 200 from the cutting position at both sides in the longitudinal direction. In other words, the affixed body produced in the step (A) preferably does not have the adhesive material applied at a part that extends along the cutting position where cutting is performed in the step (B), more preferably does not have the adhesive material applied within a range up to 1,000 from the cutting position at both sides in the longitudinal direction, and even more preferably does not have the adhesive material applied within a range up to 200 µm from the cutting position at both sides in the longitudinal direction.

Moreover, from a viewpoint of facilitating setting of the coating range of a coating machine, the shapes and ranges of coated regions when the adhesive material is applied to one surface of the affixed body are preferably the same as the shapes and ranges of coated regions of the adhesive material for the affixing surface of a negative electrode material and a separator web in the step (a1). In other words, the shapes and ranges of coated regions in the step (a1) preferably coincide with the shapes and ranges of coated regions at the one surface of the affixed body when projected in the stacking direction. Moreover, the coating weights in corresponding coated regions are preferably the same as in the step (a1).

<Step (B)>

In the step (B), the affixed body is cut at the cutting position 83 using the cutting machine 70. Note that in a case in which an affixed body that includes a positive electrode is cut in the step (B), the resultant cut bodies are each a laminate for a secondary battery.

The cutting machine 70 can be any cutting machine that can be used in the field of secondary battery production, such as a cutting machine that cuts the affixed body by sandwiching the affixed body with cutting blades from both sides in a thickness direction of the affixed body.

In the step (B) implemented after the step (A), the affixed body can be well cut while also inhibiting curling of a separator from the negative electrode as previously described.

Figure 7A:
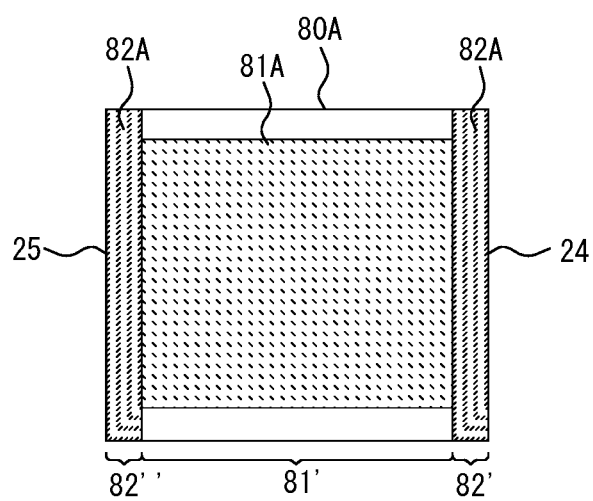
FIGS. 7A to 7C are plan views each illustrating an example of an affixing surface of a negative electrode and a separator where an adhesive material has been applied.
Figure 7B:
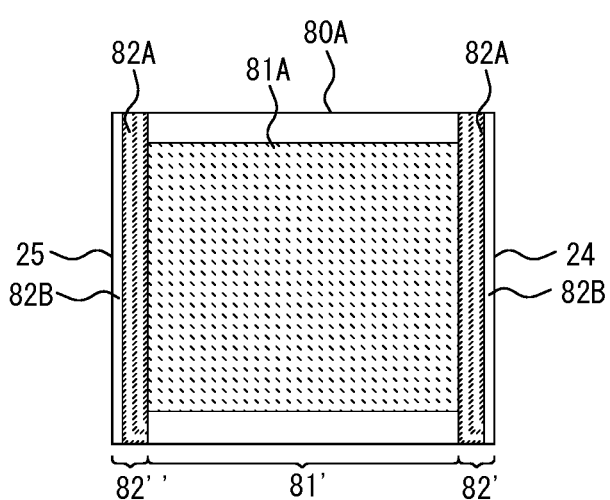
Figure 7C:
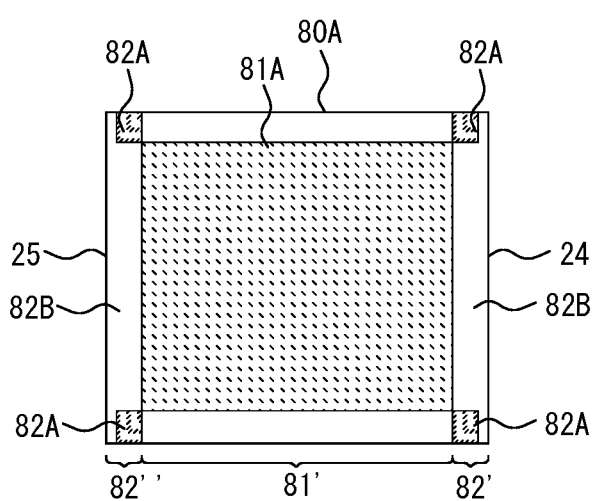

Note that the affixing surface of a negative electrode and a separator obtained through cutting of the affixing surface 80 illustrated in FIG. 5 is as illustrated in FIG. 7A, the affixing surface of a negative electrode and a separator obtained through cutting of the affixing surface 80 illustrated in FIG. 6A is as illustrated in FIG. 7B, and the affixing surface of a negative electrode and a separator obtained through cutting of the affixing surface 80 illustrated in FIG. 6B is as illustrated in FIG. 7C.

<Step (C)>

In the step (C) that is optionally implemented, a positive electrode is affixed to a cut body obtained through cutting of the affixed body in the step (B) to obtain a laminate for a secondary battery in a case in which an affixed body that does not include a positive electrode has been cut in the step (B).

Note that in a situation in which, after the step (B), an adhesive material is applied to a cut body with the aim of affixing a positive electrode in the step (C) and/or enabling good adhesion of laminates for a secondary battery to one other, the shapes and ranges of coated regions can be any shapes and ranges.

(Method of Producing Secondary Battery)

The presently disclosed method of producing a secondary battery includes a step of producing a plurality of laminates for a secondary battery using the presently disclosed method of producing a laminate for a secondary battery set forth above and a step (assembly step) of assembling a secondary battery using the laminates for a secondary battery and an electrolyte solution.

In the presently disclosed method of producing a secondary battery, a secondary battery that can display excellent battery performance is obtained as a result of laminates for a secondary battery that have been produced by the method set forth above being used.

<Assembly Step>

An organic electrolyte solution obtained by dissolving a supporting electrolyte in an organic solvent is normally used as the electrolyte solution. A lithium salt is used as the supporting electrolyte in a case in which the secondary battery is a lithium ion secondary battery, for example. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these organic solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

The secondary battery can be assembled by further stacking additional battery members (for example, an electrode and/or a separator), as necessary, with a stack that is obtained through stacking of the laminates for a secondary battery produced according to the presently disclosed method of producing a laminate for a secondary battery, subsequently placing the resultant laminate in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device, an expanded metal, or a lead plate may be provided as necessary. The shape of the secondary battery may be a coin type, button type, sheet type, cylinder type, prismatic type, flat type, or the like.

(Laminate for Secondary Battery)

The presently disclosed laminate for a secondary battery is produced using the presently disclosed method of producing a laminate for a secondary battery set forth above, for example, and, as illustrated in FIGS. 1A and 1B or FIG. 3, includes a negative electrode 20, a first separator 10 affixed to one surface of the negative electrode, a positive electrode 40 affixed to a surface of the first separator 10 at the opposite side thereof to the negative electrode 20, and a second separator 30 affixed to the other surface of the negative electrode 20 or a surface of the positive electrode 40 at the opposite side thereof to the first separator 10.

In the laminate for a secondary battery 100 or 100A, the positive electrode 40 has a smaller size in plan view than the negative electrode 20, the first separator 10, and the second separator 30 as illustrated in FIG. 2. More specifically, the negative electrode 20 of the laminate for a secondary battery 100 or 100A includes a first edge 24 and a second edge 25 that are in opposition in an orthogonal direction to the stacking direction, and the positive electrode 40 is located between the first edge 24 and the second edge 25 when viewed in the stacking direction. Note that the first edge 24 and the second edge 25 are normally edges that correspond to cutting positions where an elongated negative electrode web has been cut to obtain the negative electrode 20.

An affixing surface of the negative electrode 20 and a separator affixed to the negative electrode 20 includes a projected section 81' where the positive electrode 40 is projected and a non-projected section where the positive electrode 40 is not projected when the positive electrode 40 is projected in the stacking direction as illustrated in FIGS. 7A to 7C, for example. Moreover, the non-projected section includes a first non-projected part 82' located closer than the projected section 81' to the first edge 24 and a second non-projected part 82" located closer than the projected section 81' to the second edge 25. Furthermore, the projected section 81', the first non-projected part 82', and the second non-projected part 82" each include a coated region where an adhesive material has been applied, and a coating weight M2 in the coated regions of the first non-projected part 82' and the second non-projected part 82" is at least 0.02 g/m² more than a coating weight M1 in the coated region of the projected section 81'.

<Projected Section>

The projected section 81' is a part in the laminate for a secondary battery 100 or 100A where the positive electrode 40 is projected when the positive electrode 40 is projected in the stacking direction. The projected section 81' includes a region (coated region 81A) where an adhesive material has been applied with the coating weight M1.

Note that the coated region 81A of the projected section 81' may be the entirety of the projected section 81' or may be part of the projected section 81'.

The coating weight M1 in the coated region of the projected section 81' is preferably not less than 0.01 g/m² and not more than 3.00 g/m², more preferably not less than 0.01 g/m² and not more than 0.20 g/m², and even more preferably not less than 0.01 g/m² and not more than 0.05 g/m². When the coating weight M1 is not less than the lower limit set forth above, the negative electrode and the separator can be well adhered. Moreover, when the coating weight M1 is not more than any of the upper limits set forth above, increased internal resistance of a secondary battery can be inhibited, and injectability of electrolyte solution can be increased.

In a case in which the adhesive material is applied in a dotted shape, the average thickness of dots formed in the coated region of the projected section 81' is preferably not less than 0.2 µm and not more than 3.0 µm. When the average thickness of the dots is not less than the lower limit set forth above, the negative electrode and the separator can be well adhered. Moreover, when the average thickness of the dots is not more than the upper limit set forth above, increased internal resistance of a secondary battery can be inhibited.

Moreover, in a case in which the adhesive material is applied in a dotted shape, the arrangement pitch of dots formed in the coated region of the projected section 81' (i.e., the distance between centers of the dots in plan view) is preferably not less than 100 µm and not more than 1,000 µm, and more preferably not less than 200 µm and not more than 700 µm. When the arrangement pitch of the dots is not less than any of the lower limits set forth above, increased internal resistance of a secondary battery can be inhibited, and injectability of electrolyte solution can be increased. Moreover, when the arrangement pitch of the dots is not more than any of the upper limits set forth above, the negative electrode and the separator can be well adhered.

<Non-Projected Section>

The non-projected section is a part that is surrounded by the periphery of the negative electrode 20 and the periphery of the projected section 81' and includes a first non-projected part 82' located closer than the projected section 81' to the first edge 24 and a second non-projected part 82" located closer than the projected section 81' to the second edge 25.

—First Non-Projected Part—

The first non-projected part 82' is located between the projected section 81' and the first edge 24. The first projected section 82' includes a region (coated region 82A) where an adhesive material has been applied with the coating weight M2.

Note that the coated region 82A of the first non-projected part 82' may be the entirety of the first non-projected part 82' or may be part of the first non-projected part 82'.

—Second Non-Projected Part—

The second non-projected part 82" is located between the projected section 81' and the second edge 25. The second non-projected part 82" includes a region (coated region 82A) where an adhesive material has been applied with the coating weight M2.

Note that the coated region 82A of the second non-projected part 82" may be the entirety of the second non-projected part 82" or may be part of the second non-projected part 82".

The coating weight M2 in the coated regions 82A of the first non-projected part 82' and the second non-projected part 82" is required to be at least 0.02 g/m² more than the coating weight M1 in the coated region 81A of the projected section 81', and the difference (M2−M1) between the coating weight M2 and the coating weight M1 is preferably 0.10 g/m² or more, and more preferably 0.20 g/m² or more, and is preferably 0.50 g/m² or less, and more preferably 0.25 g/m² or less. When the difference (M2−M1) between the coating weight M2 and the coating weight M1 is not at least 0.02 g/m², it is not possible to sufficiently inhibit the separator peeling from the negative electrode and curling up when an affixed body is cut to obtain the laminate for a secondary battery. Moreover, when the difference (M2−M1) between the coating weight M2 and the coating weight M1 is within any of the ranges set forth above, curling up of the separator can be sufficiently inhibited while also inhibiting increased internal resistance of a secondary battery.

In a case in which the adhesive material is applied in a dotted shape, the average thickness of dots formed in the coated regions 82A of the first non-projected part 82' and the second non-projected part 82" is preferably 0.2 µm or more, and more preferably 0.5 µm or more. When the average thickness of the dots is not less than any of the lower limits set forth above, curling up of the separator can be sufficiently inhibited.

Moreover, in a case in which the adhesive material is applied in a dotted shape, the arrangement pitch of dots formed in the coated regions 82A of the first non-projected part 82' and the second non-projected part 82" (i.e., the distance between centers of the dots in plan view) is preferably not less than 100 µm and not more than 500 µm, and more preferably not less than 100 µm and not more than 200 µm. When the arrangement pitch of the dots is not more than any of the upper limits set forth above, curling up of the separator can be sufficiently inhibited.

The shapes and ranges of the coated regions 82A of the first non-projected part 82' and the second non-projected part 82" are not specifically limited and can be shapes and ranges such as illustrated in FIGS. 7A to 7C, for example.

The affixing surface 80A illustrated in FIG. 7A has a rectangular shape, and the coated region 81A of the projected section 81' is disposed throughout the entirety of the projected section (i.e., the entirety of a part where the positive electrode is projected when the positive electrode is projected in the stacking direction). Note that although the adhesive material is not applied at parts of the projected section 81' located at both sides in an up/down direction of the affixing surface 80A in FIG. 7A, any amount of the adhesive material may be applied at these parts.

The coated regions 82A of the first non-projected part 82' and the second non-projected part 82" are disposed throughout the entirety of the first non-projected part and the second non-projected part.

The affixing surface 80A illustrated in FIG. 7B has the same configuration as the affixing surface illustrated in FIG. 7A with the exception that the ranges of the coated regions 82A of the first non-projected part 82' and the second non-projected part 82" are different.

In the first non-projected part 82' and the second non-projected part 82" of the affixing surface 80A illustrated in FIG. 7B, the adhesive material is not applied at a part 82B that extends along the first edge 24 and a part 82B that extends along the second edge 25.

By not applying the adhesive material at the parts 82B that extend along the first edge 24 and the second edge 25 in this manner, it is possible to inhibit attachment of the adhesive material to a cutting tool used in cutting and shortening of the service life of the cutting tool.

Note that from a viewpoint of inhibiting attachment of the adhesive material to a cutting tool while also sufficiently inhibiting curling up of the separator during cutting, the range where the adhesive material is not applied is preferably within a range up to 1,000 μm from each of the first edge 24 and the second edge 25, and is more preferably within a range up to 200 μm from each of the first edge 24 and the second edge 25.

The affixing surface 80A illustrated in FIG. 7C has the same configuration as the affixing surface illustrated in FIG. 7B with the exception that the ranges of the coated regions 82A in the up/down direction of the affixing surface 80A in FIG. 7C are different.

The coated regions 82A of the first non-projected part 82' and the second non-projected part 82" of the affixing surface 80A illustrated in FIG. 7C are disposed at both up/down direction ends of the affixing surface 80A. In other words, in the first non-projected part 82' and the second non-projected part 82" of the affixing surface 80A illustrated in FIG. 7C, the adhesive material is not applied at a part 82B that extends along the first edge 24 and a part 82B that extends along the second edge 25, and the coated regions 82A are only disposed at up/down direction ends of the first non-projected part 82' and the second non-projected part 82".

By not applying the adhesive material at the parts 82B that extend along the first edge 24 and the second edge 25 in this manner, it is possible to inhibit attachment of the adhesive material to a cutting tool used in cutting and shortening of the service life of the cutting tool.

Note that from a viewpoint of inhibiting attachment of the adhesive material to a cutting tool while also sufficiently inhibiting curling up of the separator during cutting, the range where the adhesive material is not applied is preferably a range up to a distance of 1,000 μm from each of the first edge 24 and the second edge 25, and is more preferably a range up to a distance of 200 μm from each of the first edge 24 and the second edge 25.

Of the examples described above, it is preferable that the shapes and ranges of the coated regions are set as shapes and ranges such as illustrated in FIG. 7B or 7C from a viewpoint of inhibiting attachment of the adhesive material to a cutting tool while also sufficiently inhibiting curling up of the separator during cutting.

(Secondary Battery)

The presently disclosed secondary battery can be produced by the presently disclosed method of producing a secondary battery, for example, and includes the laminate for a secondary battery set forth above.

More specifically, the presently disclosed secondary battery includes: a stack obtained by stacking laminates for a secondary battery; additional battery members (for example, an electrode and/or a separator) that are provided as necessary; an electrolyte solution; and a battery container in which they are housed. Note that the electrolyte solution can be the same electrolyte solution as described for the presently disclosed method of producing a secondary battery. In order to prevent pressure increase inside the secondary battery and occurrence of overcharging or overdischarging, an overcurrent preventing device such as a fuse or a PTC device, an expanded metal, or a lead plate may be provided in the secondary battery as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

In the examples and comparative example, the following methods were used to measure and evaluate the shape, average thickness, and arrangement pitch of an adhesive material, the coating weight in a coated region, the dry adhesive strength of an electrode and a separator, the service life of a cutting tool, the separator curling rate, and the electrolyte solution injectability, output characteristics, and cycle characteristics of a secondary battery.

<Shape, Average Thickness, and Arrangement Pitch of Adhesive Material>

A laser microscope (VR-3100 produced by Keyence Corporation) was used to observe the shape of an adhesive material and to calculate the average thickness and a number-average value of the arrangement pitch from adhesive material present in a 2 mm² region.

<Coating Weight in Coated Region>

The weight difference per unit area between before and after supply of a composition for adhesion was measured for a range where the composition for adhesion was supplied in order to determine the coating weight.

<Dry Adhesive Strength of Electrode and Separator>

A laminate in which a negative electrode having an adhesive material formed at one surface and a separator were affixed (i.e., a laminate in which one negative electrode and one separator were affixed via an adhesive material) was produced as a test specimen under the same conditions as in each example or comparative example.

The test specimen was placed with the surface at the current collector side of the negative electrode facing downward, and cellophane tape was affixed to the surface at the current collector side of the negative electrode. Tape prescribed by JIS Z1522 was used as the cellophane tape. Moreover, the cellophane tape was secured to a horizontal test stage in advance. The stress when the separator was peeled off by pulling one end of the separator vertically upward at a pulling speed of 50 mm/min was measured.

A total of 6 measurements were made in this manner, an average value of the stress was determined as the peel strength, and adhesiveness of the negative electrode and the separator was evaluated by the following standard. A larger peel strength indicates higher adhesiveness.

A: Peel strength of 3 N/m or more
B: Peel strength of not less than 1 N/m and less than 3 N/m
C: Peel strength of less than 1 N/m <Service Life of Cutting Tool>

The number of cuts straight after polishing of a cutting tool was taken to be 0, and then, as the number of cuts was increased, the number of cuts (shot count) at which adhesive material became attached to the blade and caused pulling of the work (affixed body) such that the proportion of the work for which cutting could not be performed within a range of ±1 mm of the desired dimensions exceeded 1% was determined and was taken to be the tool service life. A larger shot count indicates less attachment of adhesive material to the blade and longer tool service life.

- A: Shot count of 1,000,000 or more
- B: Shot count of not less than 500,000 and less than 1,000,000
- C: Shot count of less than 500,000

<Separator Curling Rate>

After disassembling 100 produced stacks (stacks of 5 laminates for a secondary battery) to obtain 500 laminates for a secondary battery, the number of separators for which an edge section of a separator was curled and bent by at least 2 mm was counted for these 500 laminates, and a separator curling rate (=(number of separators for which edge section of separator is curled up/1,000)×100%) was determined and was evaluated by the following standard. A smaller separator curling rate indicates that curling up of separators is inhibited.

- A: Separator curling rate of less than 0.1%
- B: Separator curling rate of not less than 0.1% and less than 1%
- C: Separator curling rate of 1% or more <Electrolyte Solution Injectability>

A produced stack was enclosed in an aluminum packing case serving as a battery case, and electrolyte solution (solvent: ethylene carbonate/diethyl carbonate/vinylene carbonate=68.5/30/1.5 (volume ratio); electrolyte: $LiPF_6$ of 1 M in concentration) was injected such that no air remained. This was performed with various different injection times.

The minimum injection time for which spillage of the electrolyte solution during injection did not occur was determined and was evaluated by the following standard. A shorter minimum injection time indicates better electrolyte solution injectability.

- A: Minimum injection time of 100 s or less
- B: Minimum injection time of more than 100 s and not more than 300 s
- C: Minimum injection time of more than 300 s and not more than 500 s
- D: Minimum injection time of more than 500 s <Output Characteristics>

A produced lithium ion secondary battery was constant-current constant-voltage (CCCV) charged to 4.3 V in an atmosphere having a temperature of 25° C. for cell preparation. A prepared cell was discharged to 3.0 V by 0.2 C and 1 C constant-current methods in an atmosphere having a temperature of −10° C., and the electric capacities were determined. Moreover, a discharge capacity maintenance rate expressed by the ratio of the electric capacities (=(electric capacity at 1 C/electric capacity at 0.2 C)×100(%)) was calculated. These measurements were performed for five lithium ion secondary battery cells, and an average value of the determined discharge capacity maintenance rates was evaluated by the following standard as an output characteristic. A larger value indicates better low-temperature output characteristics.

- A: Average value for discharge capacity maintenance rate of 80% or more
- B: Average value for discharge capacity maintenance rate of not less than 70% and less than 80%
- C: Average value for discharge capacity maintenance rate of not less than 60% and less than 70%
- D: Average value for discharge capacity maintenance rate of less than 60%

<Cycle Characteristics>

A produced lithium ion secondary battery was subjected to 200 cycles of a charge/discharge operation in which the lithium ion secondary battery was charged to 4.4 V and then discharged to 3.0 V by a 0.5 C constant-current method in an atmosphere having a temperature of 45° C. A charge/discharge capacity maintenance rate expressed by the ratio of the electric capacity at the end of the $200^{th}$ cycle and the electric capacity at the end of the $5^{th}$ cycle (=(electric capacity at end of $200^{th}$ cycle/electric capacity at end of $5^{th}$ cycle)×100(%)) was determined. These measurements were performed for five lithium ion secondary battery cells, and an average value of the determined charge/discharge capacity maintenance rates was evaluated by the following standard as a cycle characteristic. A larger value indicates better cycle characteristics.

- A: Average value for charge/discharge capacity maintenance rate of 95% or more
- B: Average value for charge/discharge capacity maintenance rate of not less than 90% and less than 95%
- C: Average value for charge/discharge capacity maintenance rate of less than 90%

Example 1

<Preparation of Adhesive Material>

[Production of Particulate Polymer Having Core-Shell Structure]

First, in core portion formation, 88 parts of styrene as an aromatic vinyl monomer, 6 parts of n-butyl acrylate as a (meth)acrylic acid ester monomer, 5 parts of methacrylic acid as an acid group-containing monomer, 1 part of ethylene glycol dimethacrylate as a cross-linkable monomer, 1 part of sodium dodecylbenzenesulfonate as an emulsifier, 150 parts of deionized water, and 0.5 parts of potassium persulfate as a polymerization initiator were loaded into a 5 MPa pressure-resistant vessel equipped with a stirrer, were sufficiently stirred, and were then heated to 60° C. to initiate polymerization. At the point at which the polymerization conversion rate reached 96%, 80.7 parts of n-butyl acrylate as a (meth)acrylic acid ester monomer, 1 part of methacrylic acid, 18 parts of styrene as an aromatic vinyl monomer, and 0.3 parts of allyl methacrylate as a cross-linkable monomer were continuously added for shell portion formation, heating was performed to 70° C., and polymerization was continued. At the point at which the polymerization conversion rate reached 96%, the reaction was quenched by cooling to produce a water dispersion containing a particulate polymer.

[Production of Other Binder]

A reactor equipped with a stirrer was charged with 70 parts of deionized water, 0.15 parts of sodium lauryl sulfate (produced by Kao Corporation; product name: EMAL 2F) as an emulsifier, and 0.5 parts of ammonium persulfate, the gas phase was purged with nitrogen gas, and heating was performed to 60° C.

Meanwhile, a monomer mixture was obtained in a separate vessel by mixing 50 parts of deionized water, 0.5 parts of sodium dodecylbenzenesulfonate as an emulsifier, and 94 parts of n-butyl acrylate, 2 parts of acrylonitrile, 2 parts of methacrylic acid, 1 part of N-hydroxymethylacrylamide, and 1 part of allyl glycidyl ether as polymerizable monomers. The monomer mixture was continuously added to the aforementioned reactor over 4 hours to carry out polymerization. The reaction was carried out at 60° C. during this addition. Once the addition was completed, stirring was carried out at 70° C. for a further 3 hours to complete the reaction and produce a water dispersion containing an acrylic polymer (other binder).

<Production of Composition for Adhesion>

Inside a stirring vessel, 87 parts in terms of solid content of the water dispersion of the particulate polymer and 13 parts in terms of solid content of the water dispersion of the acrylic polymer were mixed. Next, 87 parts of propylene glycol as a polyhydric alcohol compound was added to the resultant mixture, and deionized water was also added to obtain a composition for adhesion having a solid content concentration of 15%.

<Production of Negative Electrode Web>

A 5 MPa pressure-resistant vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. At the point at which the polymerization conversion rate reached 96%, the reaction was quenched by cooling to obtain a mixture containing a binder for a negative electrode mixed material layer (SBR). The mixture containing the binder for a negative electrode mixed material layer was adjusted to pH 8 through addition of 5% sodium hydroxide aqueous solution and was then subjected to thermal-vacuum distillation to remove unreacted monomer. Thereafter, cooling was performed to 30° C. or lower to obtain a water dispersion containing the desired binder for a negative electrode mixed material layer.

Next, 100 parts of artificial graphite (volume-average particle diameter: 15.6 μm) as a negative electrode active material, 1 part in terms of solid content of a 2% aqueous solution of carboxymethyl cellulose sodium salt (produced by Nippon Paper Industries Co., Ltd.; product name: MAC350HC) as a viscosity modifier, and deionized water were mixed, were adjusted to a solid content concentration of 68%, and were then mixed at 25° C. for 60 minutes. The solid content concentration was further adjusted to 62% with deionized water and then a further 15 minutes of mixing was performed at 25° C. Deionized water and 1.5 parts in terms of solid content of the water dispersion containing the binder for a negative electrode mixed material layer described above were added to the resultant mixture, the final solid content concentration was adjusted to 52%, and a further 10 minutes of mixing was performed. The resultant mixture was subjected to a defoaming process under reduced pressure to yield a slurry composition for a secondary battery negative electrode having good fluidity.

The obtained slurry composition for a secondary battery negative electrode was applied onto both surfaces of copper foil (current collector) of 20 μm in thickness using a comma coater such as to have a thickness after drying of approximately 150 μm. The applied slurry composition was dried by conveying the copper foil inside a 60° C. oven for 2 minutes at a speed of 0.5 m/min. Thereafter, 2 minutes of heat treatment was performed at 120° C. to obtain a pre-pressing negative electrode web. The pre-pressing negative electrode web was rolled by roll pressing to obtain a post-pressing negative electrode web having a negative electrode mixed material layer thickness of 80 μm.

<Production of Positive Electrode Web>

A slurry composition for a secondary battery positive electrode was obtained by mixing 100 parts of $LiCoO_2$ having a volume-average particle diameter of 12 μm as a positive electrode active material, 2 parts of acetylene black (produced by Denka Company Limited; product name: HS-100) as a conductive material, 2 parts in terms of solid content of polyvinylidene fluoride (produced by Kureha Corporation; product name: #7208) as a binder, and N-methylpyrrolidone as a solvent, adjusting these materials to a total solid content concentration of 70%, and mixing these materials using a planetary mixer.

The obtained slurry composition for a secondary battery positive electrode was applied onto both surfaces of aluminum foil (current collector) of 20 μm in thickness using a comma coater such as to have a thickness after drying of approximately 150 μm. The applied slurry composition was dried by conveying the aluminum foil inside a 60° C. oven for 2 minutes at a speed of 0.5 m/min. Thereafter, 2 minutes of heat treatment was performed at 120° C. to obtain a positive electrode web.

The obtained positive electrode web was rolled by a roll press to obtain a post-pressing positive electrode web including positive electrode mixed material layers.

<Preparation of Separator Web>

A separator web (product name: Celgard 2500) made of polypropylene (PP) was prepared.

<Production of Laminate for Secondary Battery>

Figure 8:
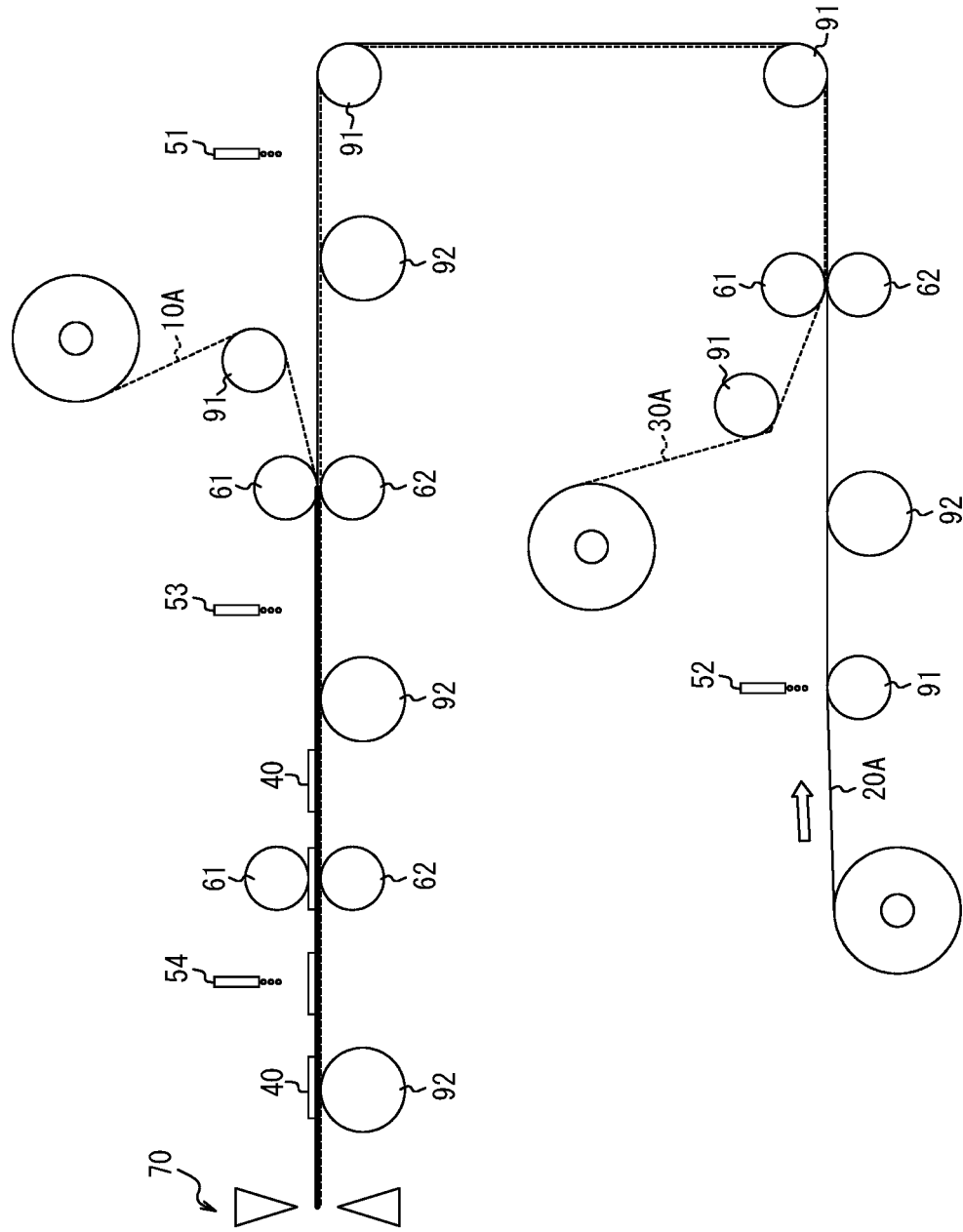
FIG. 8 is an explanatory diagram illustrating a production process of a laminate for a secondary battery in examples and a comparative example.

The composition for adhesion, the negative electrode web, the positive electrode web, and the separator web that had been produced were used to produce a laminate for a secondary battery as illustrated in FIG. 8. Note that reference sign 91 in FIG. 8 indicates a conveying roller, whereas reference sign 92 in FIG. 8 indicates a heat roller.

Specifically, a negative electrode web 20A fed from a negative electrode web roll was conveyed at a speed of 10 m/min while the composition for adhesion was applied onto one surface of the negative electrode web 20A from an inkjet head of an inkjet-type coating machine 52 (KM1024 (shear-mode type) produced by Konica) and a second separator web 30A fed from a separator web roll was affixed to the negative electrode web 20A by pressure bonding rollers 61 and 62. The composition for adhesion was also supplied onto the other surface of the negative electrode web 20A from an inkjet head of an inkjet-type coating machine 51 (KM1024 (shear-mode type) produced by Konica), and a first separator web 10A fed from a separator web roll was affixed to the laminate of the negative electrode web 20A and the second separator web 30A by pressure bonding rollers 61 and 62. In addition, the composition for adhesion was supplied onto a surface of the first separator web 10A at the opposite side thereof to the negative electrode web 20A from an inkjet head of an inkjet-type coating machine 53 (KM1024 (shear-mode type) produced by Konica), positive electrodes 40 that had been cut in advance were placed thereon, and the positive electrodes 40 were affixed to the laminate of the first separator web 10A, the negative electrode web 20A, and the second separator web 30A by pressure bonding rollers 61 and 62. Furthermore, the composition for adhesion was supplied onto the positive electrodes 40 from an inkjet head of an inkjet-type coating machine 54 (KM1024 (shear-mode type) produced by Konica), and cutting was subsequently performed by a cutting machine 70 to obtain laminates for a secondary battery in which a second separator, a negative electrode, a first separator, and a positive electrode were stacked in stated order. Moreover, the service life of a cutting tool was evaluated. The result is shown in Table 1.

Note that supply of the composition for adhesion from the coating machines 51 to 54 was performed such that coated regions had shapes and ranges such as illustrated in FIG. 6B and the coating weight of the adhesive material was as shown in Table 1 in the case of the coating machines 51 and 52, and was performed such that the composition for adhesion was only supplied to a part (first coated section) corresponding to the position of a positive electrode in the case of the coating machines 53 and 54. Also note that affixing by pressure bonding rollers 61 and 62 was performed at a temperature of 70° C. and a pressure of 1 MPa.

<Production of Stack>

Five laminates for a secondary battery that had been produced were stacked and were pressed at a temperature of 70° C. and a pressure of 1 MPa for 10 seconds to obtain a stack.

Moreover, the separator curling rate was evaluated. The result is shown in Table 1.

<Production of Secondary Battery>

The produced stack was enclosed in an aluminum packing case serving as a battery case, and electrolyte solution (solvent: ethylene carbonate/diethyl carbonate/vinylene carbonate=68.5/30/1.5 (volume ratio); electrolyte: $LiPF_6$ of 1 M in concentration) was injected. An opening of the aluminum packing case was subsequently closed by heat sealing at 150° C. to produce a stacked lithium ion secondary battery having a capacity of 800 mAh.

The electrolyte solution injectability, output characteristics, and cycle characteristics of the secondary battery were evaluated. The results are shown in Table 1.

Example 2

An adhesive material, a composition for adhesion, a negative electrode web, a positive electrode web, a separator web, a laminate for a secondary battery, a stack, and a secondary battery were produced and prepared in the same way as in Example 1 with the exception that supply of the composition for adhesion from the coating machines 51 and 52 was performed such that the coated regions had shapes and ranges such as illustrated in FIG. 6A.

Various evaluations were also performed in the same way as in Example 1. The results are shown in Table 1.

Example 3

An adhesive material, a composition for adhesion, a negative electrode web, a positive electrode web, a separator web, a laminate for a secondary battery, a stack, and a secondary battery were produced and prepared in the same way as in Example 1 with the exception that supply of the composition for adhesion from the coating machines 51 and 52 was performed such that the coated regions had shapes and ranges such as illustrated in FIG. 5.

Various evaluations were also performed in the same way as in Example 1. The results are shown in Table 1.

Example 4

An adhesive material, a composition for adhesion, a negative electrode web, a positive electrode web, a separator web, a laminate for a secondary battery, a stack, and a secondary battery were produced and prepared in the same way as in Example 1 with the exception that the coating weight and arrangement pitch of the adhesive material in the coated region 82A of the second coated section 82 were changed as shown in Table 1.

Various evaluations were also performed in the same way as in Example 1. The results are shown in Table 1.

Example 5

An adhesive material, a composition for adhesion, a negative electrode web, a positive electrode web, a separator web, a laminate for a secondary battery, a stack, and a secondary battery were produced and prepared in the same way as in Example 1 with the exception that the coating weight and arrangement pitch of the adhesive material in the coated region 81A of the first coated section 81 and the coating weight of the adhesive material in the coated region 82A of the second coated section 82 were changed as shown in Table 1.

Various evaluations were also performed in the same way as in Example 1. The results are shown in Table 1.

Example 6

An adhesive material, a composition for adhesion, a negative electrode web, a positive electrode web, a separator web, a laminate for a secondary battery, a stack, and a secondary battery were produced and prepared in the same way as in Example 1 with the exception that the average thickness and arrangement pitch of the adhesive material in the coated region 82A of the second coated section 82 were changed as shown in Table 1.

Various evaluations were also performed in the same way as in Example 1. The results are shown in Table 1.

Comparative Example 1

An adhesive material, a composition for adhesion, a negative electrode web, a positive electrode web, a separator web, a laminate for a secondary battery, a stack, and a secondary battery were produced and prepared in the same way as in Example 1 with the exception that gravure coaters were used instead of inkjet-type coating machines as the coating machines 51 to 54, and the adhesive material was applied over the entirety of an affixing surface with a coating weight of 0.02 $g/m^2$.

Various evaluations were also performed in the same way as in Example 1. The results are shown in Table 1.

TABLE 1

| | | | Example 1 | Example 2 | Example 3 | Example 4 | Example 5 | Example 6 | Comparative Example 1 |
|---|---|---|---|---|---|---|---|---|---|
| Production conditions | Application method | | Inkjet | Inkjet | Inkjet | Inkjet | Inkjet | Inkjet | Gravure |
| | Shapes and ranges of coated regions | | FIG. 6B | FIG. 6A | FIG. 5 | FIG. 6B | FIG. 6B | FIG. 6B | Entire surface |
| | First coated section | Coating weight M1 in coated region [$g/m^2$] | 0.02 | 0.02 | 0.02 | 0.02 | 0.25 | 0.02 | 0.02 |
| | | Shape of adhesive material | Dot | Dot | Dot | Dot | Dot | Dot | Entire surface |

TABLE 1-continued

|  |  |  | Example 1 | Example 2 | Example 3 | Example 4 | Example 5 | Example 6 | Comparative Example 1 |
|---|---|---|---|---|---|---|---|---|---|
|  |  | Average thickness of adhesive material [μm] | 0.5 | 0.5 | 0.5 | 0.5 | 0.5 | 0.5 | 0.3 |
|  |  | Arrangement pitch of adhesive material [μm] | 600 | 600 | 600 | 600 | 190 | 600 | — |
|  | Second coated section | Coating weight M2 in coated region [g/m²] | 0.22 | 0.22 | 0.22 | 0.04 | 0.27 | 0.22 | 0.02 |
|  |  | Shape of adhesive material | Dot | Dot | Dot | Dot | Dot | Dot | Entire surface |
|  |  | Average thickness of adhesive material [μm] | 0.5 | 0.5 | 0.5 | 0.5 | 0.5 | 1 | 0.3 |
|  |  | Arrangement pitch of adhesive material [μm] | 190 | 190 | 190 | 450 | 190 | 260 | — |
|  | Coating weight difference (M2 − M1) [g/m²] |  | 0.2 | 0.2 | 0.2 | 0.02 | 0.02 | 0.2 | 0 |
|  | Application within range up to 1,000 μm from cutting position at both sides in longitudinal direction |  | No | No | Yes | No | No | No | Yes |
| Evaluation | Dry adhesive strength |  | A | A | A | A | A | A | A |
|  | Cutting tool service life |  | A | A | C | A | A | A | B |
|  | Separator curling rate |  | A | A | A | B | A | B | C |
|  | Electrolyte solution injectability |  | A | A | A | A | C | A | A |
|  | Output characteristics |  | A | A | A | A | B | A | A |
|  | Cycle characteristics |  | A | A | A | A | B | A | A |

It can be seen from Table 1 that separator curling could be inhibited in Examples 1 to 6. On the other hand, it can be seen that separator curling occurred in Comparative Example 1 in which the adhesive material was applied uniformly over the entirety of an affixing surface.

INDUSTRIAL APPLICABILITY

According to the present disclosure, it is possible to obtain a laminate for a secondary battery in which separator curling up is inhibited.

Moreover, according to the present disclosure, it is possible to obtain a secondary battery that can display excellent battery performance using a laminate for a secondary battery in which separator curling up is inhibited.

REFERENCE SIGNS LIST 10 first separator
10A first separator web
20 negative electrode
20A negative electrode web
21 negative electrode current collector
22, 23 negative electrode mixed material layer
24 first edge
25 second edge
26 third edge
27 fourth edge
30 second separator
30A second separator web
40 positive electrode
41 positive electrode current collector
42, 43 positive electrode mixed material layer
51-54 coating machine
61, 62 pressure bonding roller
70 cutting machine
80 affixing surface
81 first coated section
81' projected section
81A coated region
82 second coated section
82' first non-projected part
82" second non-projected part
82A coated region
82B part
83 cutting position
91 conveying roller
92 heat roller
100, 100A laminate for secondary battery
200 stack

The invention claimed is:

1. A laminate for a secondary battery comprising: a negative electrode; a first separator affixed to one surface of the negative electrode; a positive electrode affixed to a surface of the first separator at an opposite side of the first separator to the negative electrode; and a second separator affixed to another surface of the negative electrode or to a surface of the positive electrode at an opposite side of the positive electrode to the first separator, wherein
the positive electrode has a smaller size in plan view than the negative electrode, the first separator, and the second separator,
the negative electrode includes a first edge and a second edge that are in opposition in an orthogonal direction to a stacking direction in plan view,
the positive electrode is located between the first edge and the second edge when viewed in the stacking direction,
an affixing surface of the negative electrode and a separator affixed to the negative electrode includes a projected section where the positive electrode is projected and a non-projected section where the positive electrode is not projected when the positive electrode is projected in the stacking direction,
the non-projected section includes a first non-projected part that is located closer than the projected section to the first edge and a second non-projected part that is located closer than the projected section to the second edge,
the projected section, the first non-projected part, and the second non-projected part each include a coated region where an adhesive material has been applied, and
a coating weight of the adhesive material in the coated regions of the first non-projected part and the second non-projected part is more than a coating weight of the adhesive material in the coated region of the projected section by a range of 0.02 g/m² to 0.50 g/m², wherein the adhesive material has not been applied within a range up to a distance of 1,000 μm from the first edge and a range up to a distance of 1,000 μm from the second edge in the non-projected section.

2. The laminate for a secondary battery according to claim 1, wherein the coating weight in the coated region of the projected section is not less than 0.01 g/m² and not more than 3.00 g/m².

3. The laminate for a secondary battery according to claim 1, wherein the coating weight in the coated region of the projected section is not less than 0.01 g/m² and not more than 0.05 g/m².

4. A secondary battery comprising the laminate for a secondary battery according to claim 1.

5. A method of producing a laminate for a secondary battery according to claim 1 that includes: a negative electrode; a first separator affixed to one surface of the negative electrode; a positive electrode affixed to a surface of the first separator at an opposite side of the first separator to the negative electrode; and a second separator affixed to another surface of the negative electrode or to a surface of the positive electrode at an opposite side of the positive electrode to the first separator, and in which the positive electrode has a smaller size in plan view than the negative electrode, the first separator, and the second separator, the method of producing a laminate for a secondary battery comprising:

a step (A) of producing an affixed body that includes a negative electrode material formed of an elongated negative electrode web or a negative electrode, an elongated first separator web affixed to one surface of the negative electrode material, and an elongated second separator web affixed to another surface of the negative electrode material or an affixed body that includes a negative electrode material formed of an elongated negative electrode web, an elongated first separator web, a positive electrode, and an elongated second separator web affixed in stated order; and a step (B) of cutting the affixed body, wherein the step (A) includes a step (a1) of applying an adhesive material at an affixing surface of the negative electrode material and a separator web that is to be affixed to the negative electrode material, the adhesive material is applied in the step (a1) such that a first coated section including a region where the adhesive material is applied with a coating weight M1 and a second coated section including a region where the adhesive material is applied with a coating weight M2 that is more than the coating weight M1 by a range of 0.02 g/m² to 0.50 g/m² are located alternately in a longitudinal direction of the affixed body, the affixed body is cut within a range where the second coated section is located in the step (B), and in an obtained laminate for a secondary battery, the positive electrode is located at a position opposite the first coated section.

6. The method of producing a laminate for a secondary battery according to claim 5, wherein application of the adhesive material is performed using an inkjet method.

7. The method of producing a laminate for a secondary battery according to claim 5, wherein the adhesive material is not applied at a part that extends along a cutting position where the affixed body is cut in the step (B).

8. The method of producing a laminate for a secondary battery according to claim 5, wherein the adhesive material is not applied within a range up to 1,000 μm at both sides in a longitudinal direction from a cutting position where the affixed body is cut in the step (B).

9. The method of producing a laminate for a secondary battery according to claim 5, wherein the coating weight M1 is not less than 0.01 g/m² and not more than 3.00 g/m².

10. A method of producing a secondary battery comprising:

a step of producing a plurality of laminates for a secondary battery using the method of producing a laminate for a secondary battery according to claim 5;

a step of stacking the laminates for a secondary battery that are obtained to obtain a stack; and a step of housing the stack inside a battery container.

11. A laminate for a secondary battery comprising: a negative electrode; a first separator affixed to one surface of the negative electrode; a positive electrode affixed to a surface of the first separator at an opposite side of the first separator to the negative electrode; and a second separator affixed to another surface of the negative electrode or to a surface of the positive electrode at an opposite side of the positive electrode to the first separator, wherein the positive electrode has a smaller size in plan view than the negative electrode, the first separator, and the second separator, the negative electrode includes a first edge and a second edge that are in opposition in an orthogonal direction to a stacking direction in plan view, the positive electrode is located between the first edge and the second edge when viewed in the stacking direction, an affixing surface of the negative electrode and a separator affixed to the negative electrode includes a projected section where the positive electrode is projected and a non-projected section where the positive electrode is not projected when the positive electrode is projected in the stacking direction, the non-projected section includes a first non-projected part that is located closer than the projected section to the first edge and a second non-projected part that is located closer than the projected section to the second edge, the projected section, the first non-projected part, and the second non-projected part each include a coated region where an adhesive material has been applied, and a coating weight of the adhesive material in the coated regions of the first non-projected part and the second non-projected part is more than a coating weight of the adhesive material in the coated region of the projected section by a range of 0.02 g/m² to 0.50 g/m², wherein the coating weight in the coated region of the projected section is not less than 0.01 g/m² and not more than 0.05 g/m².

12. The laminate for a secondary battery according to claim 11, wherein the adhesive material has not been applied at an edge part that extends along the first edge and an edge part that extends along the second edge in the non-projected section.

13. A secondary battery comprising the laminate for a secondary battery according to claim 11.

* * * * *